United States Patent
Lee

(10) Patent No.: US 10,657,049 B2
(45) Date of Patent: May 19, 2020

(54) MEMORY SYSTEM AND OPERATING METHOD THEREOF

(71) Applicant: SK hynix Inc., Gyeonggi-do (KR)

(72) Inventor: Dong-Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 301 days.

(21) Appl. No.: 15/622,134

(22) Filed: Jun. 14, 2017

(65) Prior Publication Data

US 2018/0107594 A1    Apr. 19, 2018

(30) Foreign Application Priority Data

Oct. 17, 2016    (KR) .......................... 10-2016-0134229

(51) Int. Cl.
*G06F 12/02*    (2006.01)
*G06F 12/1027*    (2016.01)

(52) U.S. Cl.
CPC ...... *G06F 12/0292* (2013.01); *G06F 12/0246* (2013.01); *G06F 12/1027* (2013.01); *G06F 2212/7201* (2013.01)

(58) Field of Classification Search
CPC ............. G06F 12/0292; G06F 12/0246; G06F 12/1027; G06F 2212/7201
See application file for complete search history.

(56) References Cited

U.S. PATENT DOCUMENTS

| | | | | |
|---|---|---|---|---|
| 5,774,715 A | * | 6/1998 | Madany | ............... G06F 16/1744 |
| 5,790,804 A | * | 8/1998 | Osborne | ............ H04Q 11/0478 |
| | | | | 709/245 |
| 5,987,582 A | * | 11/1999 | Devic | .................. G06F 12/1081 |
| | | | | 345/543 |
| 6,065,104 A | * | 5/2000 | Tng | .......................... G06F 12/10 |
| | | | | 707/999.1 |
| 6,609,176 B1 | * | 8/2003 | Mizuno | .................. G06F 3/0601 |
| | | | | 711/112 |
| 8,176,233 B1 | * | 5/2012 | Karamcheti | ............ G06F 12/06 |
| | | | | 711/103 |
| 8,671,239 B2 | * | 3/2014 | Yang | .................... G06F 12/0246 |
| | | | | 365/185.33 |
| 2005/0256976 A1 | * | 11/2005 | Susairaj | .............. G06F 12/1081 |
| | | | | 710/3 |

(Continued)

FOREIGN PATENT DOCUMENTS

KR    1020100105127    9/2010
KR    1020160035737    4/2016

*Primary Examiner* — Ramon A. Mercado
(74) *Attorney, Agent, or Firm* — IP & T Group LLP

(57) ABSTRACT

A memory control device may include a buffer memory in which data is accessed by a unit of a slot; and a buffer interface suitable for controlling an access to the buffer memory. The buffer interface may include a mapping table suitable for storing the mapping between multiple virtual slot identification information (VBIDs) and multiple physical slot identification information (PBIDs); a buffer allocation unit suitable for determining a start VBID of the mapping table and the number of slots (NID) based on a size of data to write in the buffer memory, and allocating PBIDs of a free status to a buffer slot sequence in the mapping table, the buffer slot sequence including slots determined based on the start VBID and the NID; and a buffer access unit suitable for accessing data at positions of the PBIDs of the buffer memory based on the mapping table.

20 Claims, 16 Drawing Sheets

(56) References Cited

U.S. PATENT DOCUMENTS

| | | | |
|---|---|---|---|
| 2006/0126615 A1* | 6/2006 | Angtin | H04L 49/90 370/389 |
| 2008/0155224 A1* | 6/2008 | Crandall | G06F 12/10 711/203 |
| 2009/0248950 A1* | 10/2009 | Tamaki | G06F 12/145 711/6 |
| 2011/0004723 A1* | 1/2011 | Kheng-Chong | G06F 12/0246 711/103 |
| 2012/0284587 A1* | 11/2012 | Yu | G06F 3/0608 714/773 |
| 2013/0031306 A1* | 1/2013 | Kim | G06F 12/0862 711/113 |
| 2013/0212341 A1* | 8/2013 | Tardif | G11B 20/10046 711/154 |
| 2016/0267052 A1* | 9/2016 | Metzler | G06F 15/17331 |
| 2017/0242794 A1* | 8/2017 | Simionescu | G06F 12/0895 |
| 2018/0107594 A1* | 4/2018 | Lee | G06F 12/0246 |
| 2019/0146712 A1* | 5/2019 | Lee | G06F 3/0659 |

* cited by examiner

FIG. 8

| PBID NO | Status |
|---|---|
| 0 | free |
| 1 | free |
| 2 | use |
| 3 | free |
| 4 | use |
| ⋮ | |
| (M-2) | use |
| (M-1) | use |
| M | free |

FIG. 9

Table 910:
| VBID | Vaddr |
|---|---|
| 0 | 0X |
| 1 | 1X |
| 2 | 2X |
| 3 | 3X |
| 4 | 4X |
| ... | ... |
| (N-2) | (N-2)X |
| (N-1) | (N-1)X |
| N | NX |

913, 915

Table 920:
| PBID | Paddr |
|---|---|
| 0 | 0X |
| 1 | 1X |
| 2 | 2X |
| 3 | 3X |
| 4 | 4X |
| ... | ... |
| (M-1) | (N-1)X |
| M | NX |

923, 925

Table 930:
| VBID | PBID |
|---|---|
| 0 | 7 |
| 1 | 10 |
| 2 | M |
| 3 | (M-2) |
| ... | ... |
| (N-2) | 0 |
| (N-1) | (M-4) |
| N | (M-7) |

| t | PHYSICAL Addressing 1010 | | VIRTUAL Addressing 1020 | | V2P mapping table 1030 | |
|---|---|---|---|---|---|---|
| | PBID 1013 | pAddr.hex 1015 | VBID 1023 | vAddr.hex 1025 | VBID(ADD) 1033 | PBID(DAT) 1035 |
| 0 | 7 | E000 | 0 | 0 | 0 | 7 |
| 1 | 0 | 0 | 1 | 2000 | 1 | 0 |
| 2 | 1 | 2000 | 2 | 4000 | 2 | 1 |
| 3 | 4 | 8000 | 3 | 6000 | 3 | 4 |
| 4 | 2 | 4000 | 4 | 8000 | 4 | 2 |
| 5 | 6 | C000 | 5 | A000 | 5 | 6 |
| 6 | 5 | A000 | 6 | C000 | 6 | 5 |
| 7 | 3 | 6000 | 7 | E000 | 7 | 3 |
| 8 | 3 | 6000 | 8 | 10000 | 8 | 3 |
| 9 | 0 | 0 | 9 | 12000 | 9 | 0 |
| 10 | 2 | 4000 | 10 | 14000 | 10 | 2 |
| 11 | 5 | A000 | 11 | 16000 | 11 | 5 |
| 12 | 0 | 0 | 12 | 18000 | 12 | 0 |
| 13 | 5 | A000 | 13 | 1A000 | 13 | 5 |
| 14 | 4 | 8000 | 14 | 1C000 | 14 | 4 |
| 15 | 7 | E000 | 15 | 1E000 | 15 | 7 |
| 16 | 6 | C000 | 0 | 0 ← roll back | 0 | 6 |
| 17 | 2 | 4000 | 1 | 2000 | 1 | 2 |
| 18 | 1 | 2000 | 2 | 4000 | 2 | 1 |

Buffer Sequence#1 (1041)

Buffer Sequence#2 (1043)

← 1045

MEMORY SYSTEM AND OPERATING METHOD THEREOF

CROSS-REFERENCE TO RELATED APPLICATION

This application claims priority under 35 U.S.C. § 119 to Korean Patent Application No. 10-2016-0134229 filed on Oct. 17, 2016 in the Korean Intellectual Property Office, the disclosure of which is incorporated herein by reference in its entirety.

TECHNICAL FIELD

Exemplary embodiments relate to a memory system, and more particularly, to a memory system and an operating method thereof.

DISCUSSION OF THE RELATED ART

Recently, the paradigm of the computer environment is changed into a ubiquitous computing environment which allows users to access a computer system anywhere anytime. For this reason, the use of portable electronic devices, such as mobile phones, digital cameras, laptop computers and the like, is surging. The portable electronic devices generally employ a memory system using a memory device, which is a data storage device. A data storage device may be used as a main memory device or an auxiliary memory device of a portable electronic device.

A data storage device using a memory device has excellent stability and durability since the data storage device does not include a mechanical driving unit. Also, the data storage device using a memory device is advantageous in that it may access data quickly and consume a small amount of power. Non-limiting examples of the data storage device having these advantages include a Universal Serial Bus (USB) memory device, a memory card with diverse interfaces, a Solid-State Drive (SSD) and so forth.

In a memory system, writing data may be used to store data in a memory device. For example, a write command from a host with respect to a solid state drive (SSD) device may be defined as writing data in the memory device. Also, in the memory system, reading data may be used read data stored in the memory device. For example, a read command from the host with respect to the SSD device may be defined as reading data from the memory device. When writing data in the memory device or reading data written in the memory device, the memory system may buffer data in a buffer memory.

In a memory system, when accessing a buffer memory, a random access scheme requires a buffer pointer for each block, and a sequential access scheme has an overhead of managing a buffer pointer.

SUMMARY

Various embodiments are directed to a device and a method capable of dividing data to buffer into a plurality of slots each having a predetermined size and buffering data of the plurality of slots through one pointer.

Also, various embodiments are directed to a memory system which maps the physical address information of a buffer memory to a virtual address information based on a host command and a data size, and accesses received data based on the mapped address information.

In an embodiment, a memory control device may include: a buffer memory in which data is accessed by a unit of a slot; and a buffer interface suitable for controlling access to the buffer memory. The buffer interface may include a mapping table suitable for storing the mapping between multiple virtual slot identification information (VBIDs) and multiple physical slot identification information (PBIDs); a buffer allocation unit suitable for determining a start VBID of the mapping table and the number of slots (NID) based on a size of data to write in the buffer memory, and allocating PBIDs of a free status to a buffer slot sequence in the mapping table, the buffer slot sequence including slots determined based on the start VBID and the NID; and a buffer access unit suitable for accessing data at positions of the PBIDs of the buffer memory based on the mapping table.

In an embodiment, a memory system may include: a host; a memory device; and a controller coupled to the host and the memory device. The controller may include a host interface suitable for interfacing an access command and data with the host; a memory interface suitable for interfacing an access command and data with the memory device; a buffer memory in which data is accessed by a unit of a slot; and a buffer interface suitable for generating a mapping table and buffering data in the buffer memory based on the mapping table, wherein the mapping table stores the mapping between multiple virtual slots and multiple physical slots of the buffer memory accessed by the unit of slot based on the access command from the host interface and a data size.

In an embodiment, a method for accessing a buffer memory in which data is accessed by a unit of a slot may include: determining a start virtual slot identification information (VBID) of a mapping table and the number of slots (NID) based on a size of data to write in the buffer memory, wherein the mapping table stores the mapping between multiple virtual slot identification information (VBIDs) and multiple physical slot identification information (PBIDs); allocating PBIDs of a free status to a buffer slot sequence in the mapping table, the buffer slot sequence including slots determined based on the start VBID and the NID; and accessing data at positions of the PBIDs of the buffer memory based on the mapping table.

In an embodiment, a method for operating a memory system including a buffer memory in which data is accessed by a unit of a slot may include: receiving an access command and information regarding a data size from a host interface; a buffer interface process of generating a mapping table and buffering data in the buffer memory based on the mapping table, wherein the mapping table stores the mapping between multiple virtual slots and multiple physical slots of the buffer memory accessed by the unit of slot based on the access command and the data size; and transmitting the data buffered in the buffer memory to one of a memory device or a host.

BRIEF DESCRIPTION OF THE DRAWINGS

FIG. 8 is a diagram illustrating a slot status table in accordance with an embodiment.

FIG. 9 is a diagram illustrating a mapping table in accordance with an embodiment.

FIG. 10 is a diagram illustrating an example of a mapping table in accordance with an embodiment.

DETAILED DESCRIPTION

Figure 1:
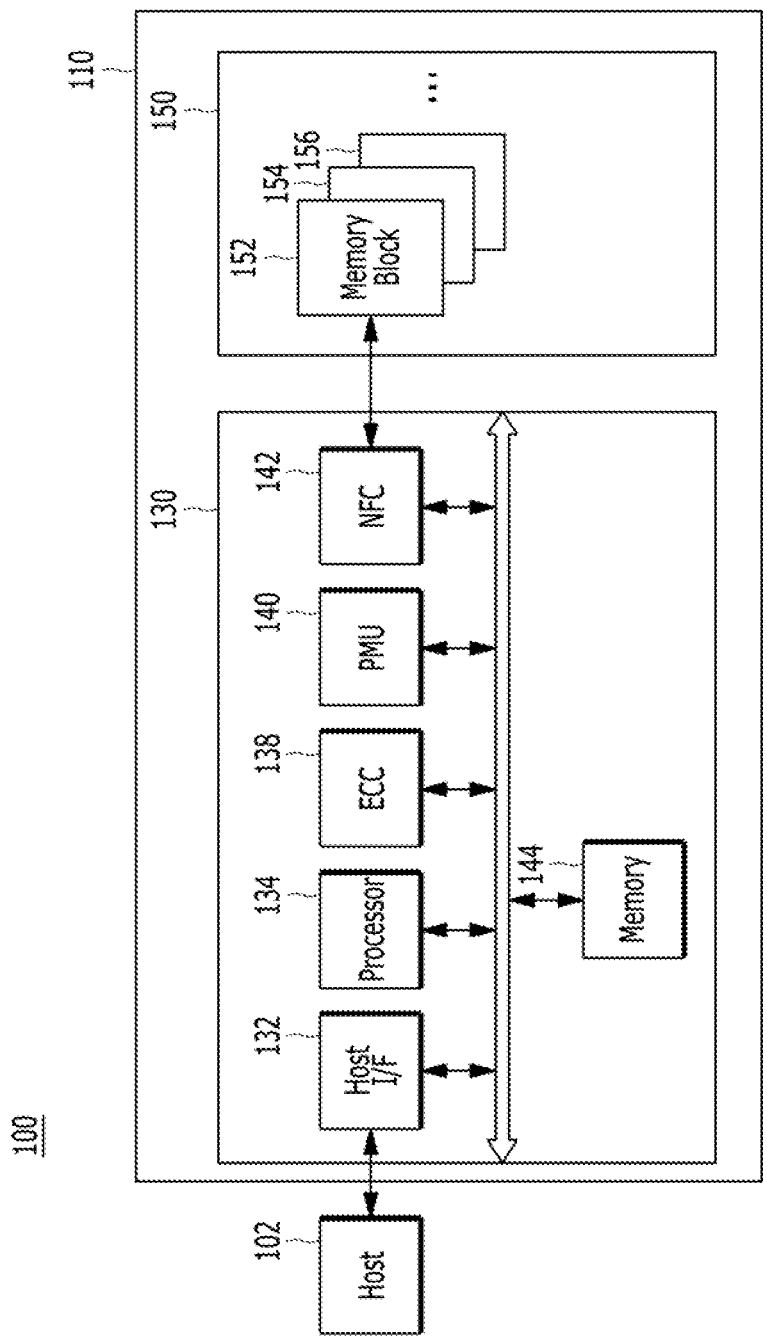
FIG. 1 is a block diagram illustrating a data processing system including a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented, rotated 90 degrees or at other orientations, and the spatially relative descriptors used herein should be interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art, and will not be interpreted in an idealized or overly formal sense unless expressly so defined herein.

In the following description, numerous specific details are set forth to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature, described in connection with one embodiment may be used singly or in combination with other elements of another embodiment, unless specifically indicated otherwise.

Hereinafter, the various embodiments of the present invention will be described in detail with reference to the attached drawings.

FIG. 1 illustrates a data processing system 100 including a memory system 110, according to an embodiment of the present invention.

Referring to FIG. 1, the data processing system 100 may include a host 102 and the memory system 110.

The host 102 may be any suitable electronic device. The host 102 may be or include, for example, a portable electronic device such as a mobile phone, an MP3 player and a laptop computer or a non-portable electronic device such as a desktop computer, a game player, a television (TV) and a projector.

The memory system 110 may operate in response to a request from the host 102. For example, the memory system 110 may store data provided by the host 102 and the memory system 110 may also provide stored data to the host 102. Data which are stored in the memory system may be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 may store data which may be accessed by the host 102. The controller 130 may control data exchange between the memory device 150 and the host 102. For example, under the control of the controller 130, data received from the host may be stored in the memory device 150, and stored data in the memory device 150 may be read and transmitted to the host 102.

The controller 130 and the memory device 150 may be integrated into one semiconductor device. For instance, the controller 130 and the memory device 150 may be integrated into one semiconductor device to form a solid state drive (SSD). When the memory system 110 is used as an SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells which are electrically coupled to a word line (WL). The memory cells may be single bit cells or multi-bit cells. The memory cells may be arranged in a two or three dimensional stacked structure. The memory device 150 may be a nonvolatile memory device, for example, a flash memory. The flash memory may have a three-dimensional (3D) stack structure.

The controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than a threshold number of correctable error bits, then may output an error correction fall signal indicating failure in correcting the error bits.

The ECC unit 138 may perform an error correction operation based on any suitable method including a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory. It is noted that a different memory interface may be employed depending upon the type of memory device employed.

The memory 144 may serve as a working memory of the memory system 110 and the controller 130. The memory 144 may store data for driving the memory system 110 and the controller 130. The controller 130 may control the memory device 150 in response to a request from the host 102. For example, the controller 130 may provide data read from the memory device 150 to the host 102 and store the data provided from the host 102 in the memory device 150. When the controller 130 controls an operation of the memory device 150 such as, for example, a read, write, program and erase operation, the memory 144 may store data which are used by the controller 130 and the memory device 150 for the operation.

The memory 144 may be implemented with a volatile memory such as, for example, a static random access memory (SRAM) or a dynamic random access memory (DRAM). As described above, the memory 144 may store data used by the host 102 and the memory device 150 for an operation including a read and a write operation. For storing the data, the memory 144 may include a program memory, a data memory, a write buffer, a read buffer, a map buffer, and the like.

The processor 134 may control the general operations of the memory system 110, and a write operation or a read operation for the memory device 150, in response to a write request or a read request received from the host 102, respectively. For example, the processor 134 may drive firmware, which is referred to as a flash translation layer (FTL), to control the general operations of the memory system 110. The processor 134 may be implemented, for example, with a microprocessor or a central processing unit (CPU).

Figure 2:
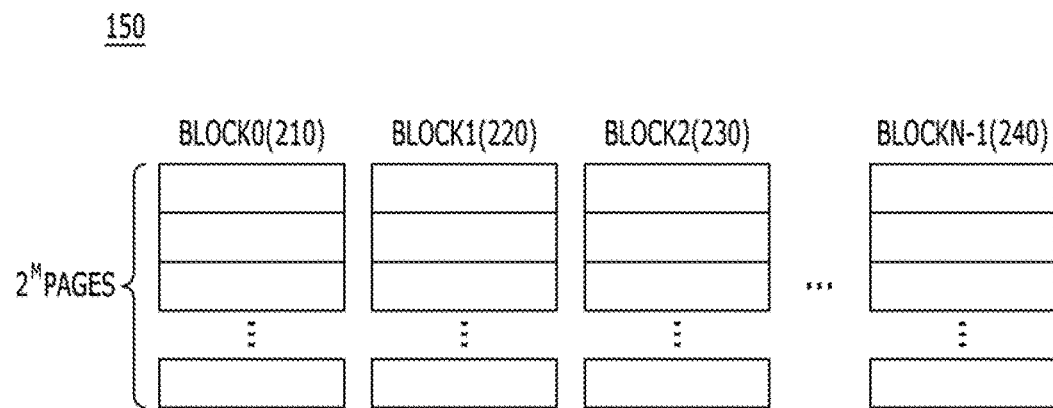
FIG. 2 is a diagram schematically illustrating a memory device included in the memory system in accordance with the embodiment of the present invention.
Figure 3:
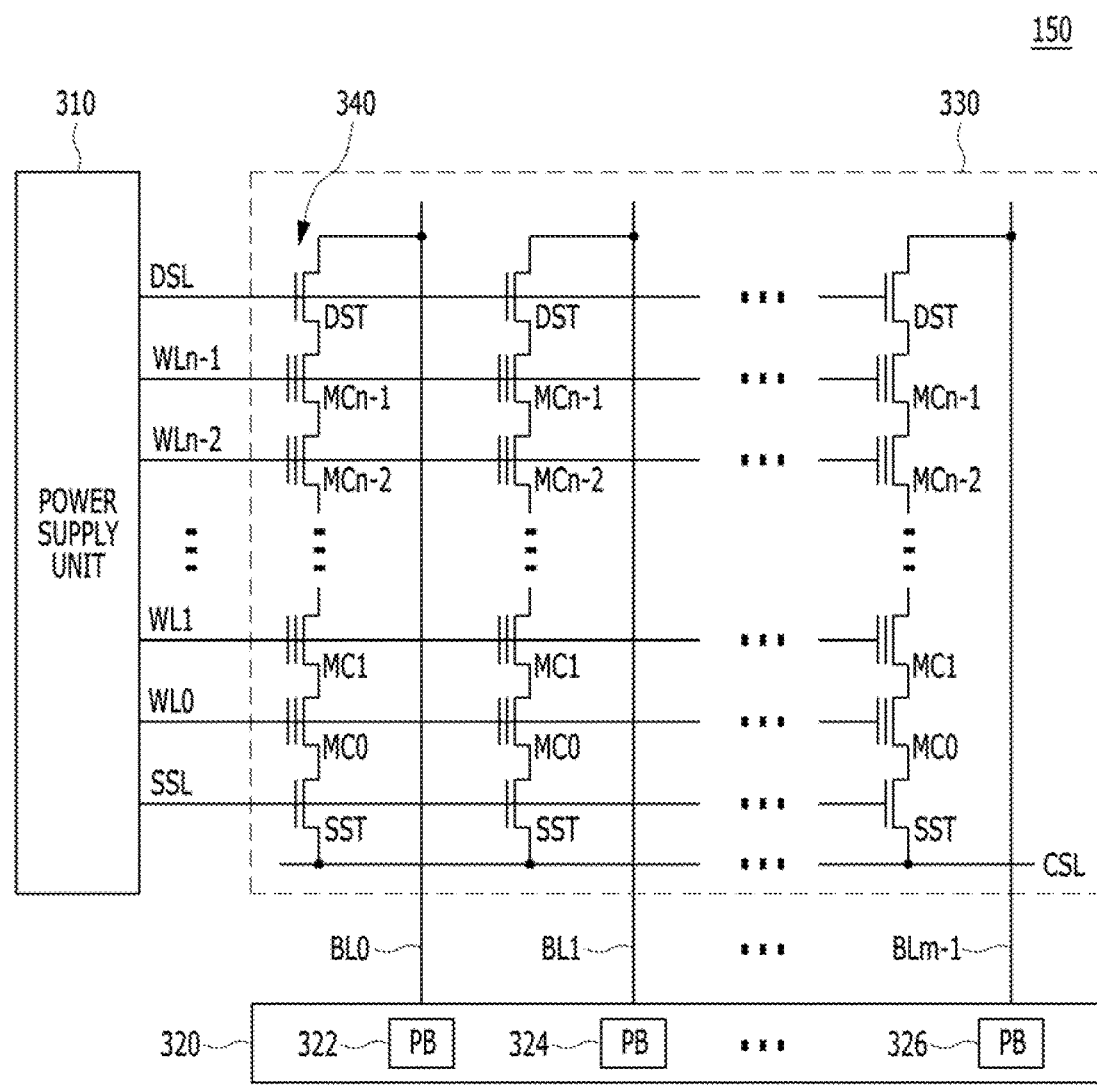
FIG. 3 is a diagram schematically illustrating a memory cell array circuit including memory blocks in the memory device in accordance with the embodiment of the present invention.
Figure 4:
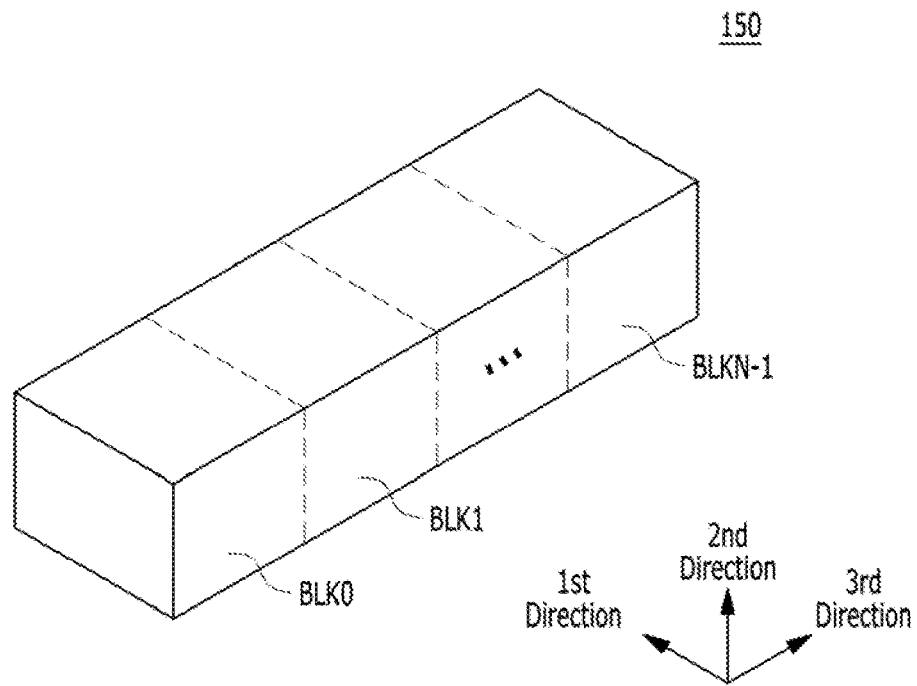
FIG. 4 is a diagram schematically illustrating a structure of the memory device in the memory system in accordance with the embodiment of the present invention.

FIG. 2 is a diagram illustrating an example of a memory device of a memory system in accordance with an embodiment of the present invention. FIG. 3 is a diagram schematically illustrating a memory cell array circuit of a memory block in a memory device in accordance with an embodiment of the present invention. FIG. 4 is a diagram schematically illustrating the structure of a memory device in accordance with an embodiment of the present invention, in which the memory device may be realized as a 3-dimensional non-volatile memory device.

Referring to FIG. 2, the memory device 150 may include a plurality of memory blocks. For example, the memory device 150 may include a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may include a plurality of memory cells which are electrically coupled to a word line.

Furthermore, the memory device 150 may include a plurality of memory blocks, as single level cell (SLC) memory blocks and/or multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which is implemented with memory cells that are each capable of storing 3-bit data may also be referred to as a triple level cell (TLC) memory block.

Each of the memory blocks 210 to 240 may store the data provided from the host 102 during a write operation, and provide the stored data to the host 102 during a read operation.

Referring to FIG. 3, the memory block 330 may include a plurality of cell strings 340 which are electrically coupled to a plurality of corresponding bit lines BL0 to BLm-1, respectively. The cell string 340 of each column may include at least one drain select transistor DST and at least one source select transistor SST. A plurality of memory cell transistors MC0 to MCn-1 may be electrically coupled in series between the select transistors SST and DST. The respective memory cells MC0 to MCn-1 may be configured by multi-level cells (MLC) each of which stores data information of a plurality of bits. For reference, in FIG. 3, 'DSL' denotes a drain select line that is, a string select line, 'SSL' denotes a source select line that is, a ground select line, and 'CSL' denotes a common source line.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. During a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. The read/write circuit 320 may include a plurality of page buffers (PBs) 322, 324 and 326 respectively corresponding to columns or bit lines, or pairs of columns or pairs of bit lines, and a plurality of latches (not shown) may be included in each of the page buffers 322, 324 and 326.

The memory device 150 may be realized as a 2-dimensional or 3-dimensional memory device. For example, as shown in FIG. 4, when the memory device 150 is realized as a 3-dimensional nonvolatile memory device, the memory device 150 may include a plurality of memory blocks BLK0 to BLKN-1. For example, the respective memory blocks BLK0 to BLKN-1 may be realized as a 3-dimensional structure by including a structure which extends in first to third directions for example, the x-axis direction, the y-axis direction and the z-axis direction.

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one source select line, a plurality of word lines, at least one dummy word line, and a common source line, and include a plurality of transistor structures.

Various embodiments of the present disclosure are directed to a device and a method for accessing a buffer memory in an electronic device or a memory system. The electronic device or the memory system may process randomly or sequentially the traffic of a host device. When accessing a buffer, one of a random scheme and a sequential scheme may be used. The random scheme may represent data by a predetermined slot for example, 512 byte, 4K byte, etc. The sequential scheme may represent data having a size larger than a unit of the slot by consecutive addressing. The random scheme and the sequential scheme may have different efficiencies depending on a way of representing a data buffer. For example, while the descriptor of the random scheme may be defined by a pointer optimized to random (for example, a slot is 4K bytes, and the descriptor of the sequential scheme may need description for N number of slots each of which is, for example, 4 KB of the random scheme. A memory system or a memory device in accordance with various embodiments of the present disclosure may provide a device and a method capable of consistently representing data by the random scheme and/or the sequential scheme.

Figure 5:
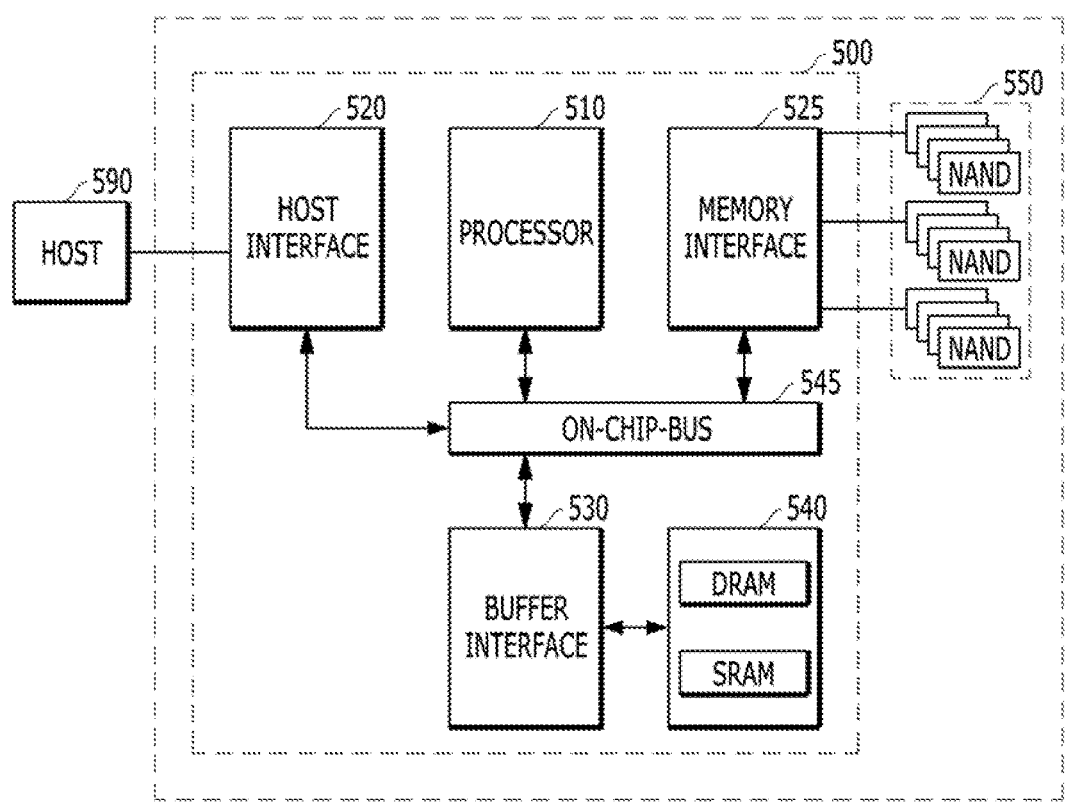
FIG. 5 is a diagram illustrating a memory system in accordance with an embodiment.

FIG. 5 is a diagram illustrating a memory system in accordance with an embodiment.

Referring to FIG. 5, the memory system may include a controller 500. The controller 500 may be the control unit of an electronic device. The electronic device may include, for example, at least one of a smart phone, a tablet personal computer (PC), a mobile phone, a video phone, an E-book reader, a desktop PC, a laptop PC, a netbook computer, a workstation, a server, a personal digital assistant (PDA), a portable multimedia player (PMP), an MP3 player, a medical instrument, a camera and a wearable device.

In some embodiments, the controller 500 may include a solid state drive (SSD) or an embedded multimedia card (eMMC) coupled to a host device. The host device may include an electronic device. If the controller 500 is an SSD, the memory system may be configured to write program data provided from an external device for example, a host device, in a memory device, in response to a write request of the external device. In the following descriptions, write and program may be used as terms having the same meaning. Additionally, the memory system may be configured to provide data written in the memory device, to the external device, in response to a read request of the external device. The memory system may be configured by a Personal Computer Memory Card International Association (PCM-CIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), or a solid state drive (SSD).

FIG. 5 illustrates an example of the configuration of an SSD device as the memory system in accordance with an embodiment. The controller 500 may include a processor 510, a host interface 520, a memory interface 525, a buffer interface 530, a buffer memory 540, and a bus (on-chip bus) 545.

The host interface 520 may perform an interface function between the controller 500 and a host 590. The memory interface 525 may perform an interface function between the controller 500 and the memory device 550.

The buffer memory 540 may be configured by a dynamic random access memory (DRAM) and/or a static random access memory (SRAM). The buffer memory 540 may include a buffer region which temporarily stores data between the host 590 and the memory device 550, a cache region which stores the information of the memory system, a program region which stores the programs of the memory system, and so forth. The buffer memory 540 in accordance with the embodiment of the present disclosure will be described as a buffer which temporarily stores data when transmitting data from the host 590 to the memory device 550 or transmitting data from the memory device 550 to the host 590. The processor 510 may control general operations of the memory system. The processor 510 may control, by controlling the buffer interface 530, an operation for storing data in the memory device 550 in response to a write request for example, a write or program command received from the host 590 and an operation for reading data written in the memory device 550 and outputting the read-out data to the host 590 in response to a read request for example, a read command from the host 590. The buffer interface 530 may transmit data from the host interface 520 or the memory interface 525, to the buffer memory 540, and output data stored in the buffer memory 540, to the memory interface 525 or the host interface 520, under control of the processor 510. The bus 545 may be coupled with the processor 510, the host interface 520, the memory interface 525, the buffer interface 530 and the buffer memory 540 in the controller 500, and provide the paths of data, commands and/or control signals.

The host 590 may serve as a subject which addresses the memory device 550 with a protocol. The host interface 520 may serve as a channel which communicates with the host 590. The host interface 520 may be a SATA, a PCI-e, an eMMC or a UFS. The memory interface 525 may serve as a subject which actually accesses (reads, programs or erases) the memory device 550. The buffer interface 530 may serve as a subject which controls the buffer memory 540. The buffer interface 530 may be included in the processor 510.

Figure 6:
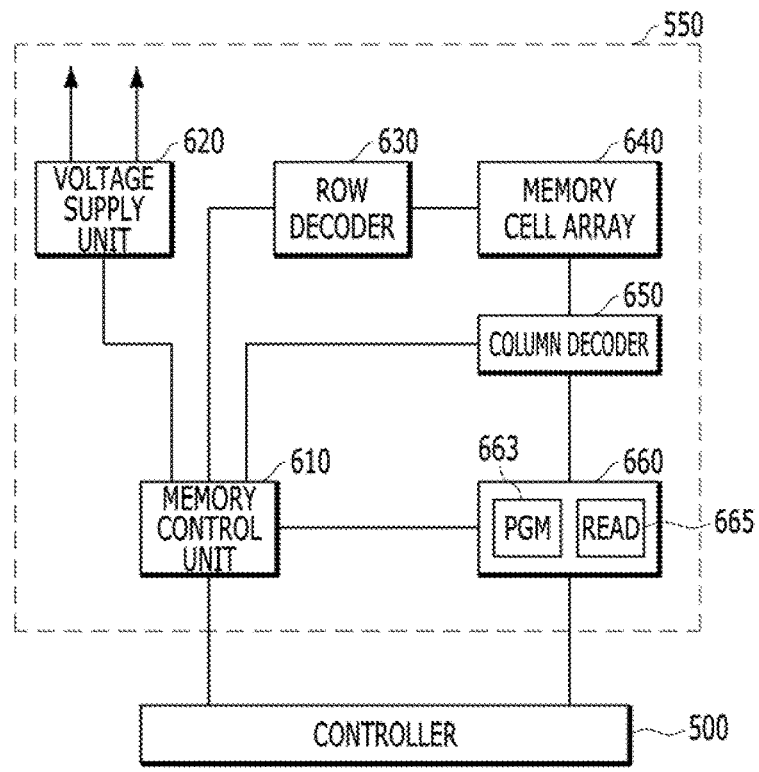
FIG. 6 is a diagram illustrating a memory device in accordance with an embodiment.

FIG. 6 is a diagram illustrating a memory device 550 in accordance with an embodiment.

Referring to FIG. 6, the memory device 550 may include a memory control unit or a program logic 610, a voltage supply unit 620, a row decoder 630, a memory cell array 640, a column decoder 650, and a program/read circuit 660.

The memory device 550 may include a flash memory device such as a NAND flash or a NOR flash, a ferroelectric random access memory (FeRAM), a phase change random access memory (PCRAM), a magnetic random access memory (MRAM) or a resistive random access memory (ReRAM). In the following descriptions, the memory device 550 may be described as a NAND flash being a nonvolatile memory device.

The memory cell array 640 may be coupled to a plurality of word lines (WL) and a plurality of bit lines (BL). The memory cell array 640 may include a plurality of memory cells respectively disposed at regions where the plurality of word lines and the plurality of bit lines intersect with each other. The memory cell array 640 may receive, together with a command (CMD), an address (ADDR) for indicating a memory cell to be accessed. The address (ADDR) may include a row address (X_ADDR) for selecting a word line (WL) of the memory cell array 640 and a column address (Y_ADDR) for selecting a bit line (BL) of the memory cell array 640.

The row decoder 630 may be coupled to the memory cell array 640 through the word lines (WL), and select at least one of the word lines (WL) in response to the row address (X_ADDR). The column decoder 650 may be coupled to the memory cell array 640 through the bit lines (BL), and select at least one of the bit lines (BL) in response to the column address (Y_ADDR).

The program/read circuit 660 may include a program (PGM) circuit 663 and a read circuit 665. The program circuit 663 may be coupled to a selected bit line (BL) through the column decoder 650, and perform a program operation that is, a data write operation by providing a program pulse to a selected memory cell of the memory cell array 640. The read circuit 665 may be coupled to a selected bit line (BL) through the column decoder 650, sense the level of a selected memory cell of the memory cell array 640, and read or output the data stored in the selected memory cell. The read circuit 665 may output data to an exterior of the memory device 550, for example, the controller 500.

The voltage supply unit 620 may generate various types of voltages for performing program, read and erase operations for the memory cell array 640, based on voltage control of the memory control unit 610. Further, the voltage supply unit 620 may generate driving voltages or bias voltages for driving the plurality of word lines (WL) and the plurality of bit lines (BL), for example, a set program voltage, a reset voltage, a read voltage and a cutoff voltage.

The memory control unit 610 may output voltage control signals for programming data to the memory cell array 640 or reading data from the memory cell array 640, to the voltage supply unit 620, based on a command (CMD), an address (ADDR) and a control signal (CTRL) which are received from the controller 500. The memory control unit 610 may provide operation control signals received from the controller 500, to the program/read circuit 660, the voltage supply unit 620, the row decoder 630 and the column decoder 650. The memory control unit 610 may generally control operations in the memory device 550.

Referring again to FIG. 5, the memory system may analyze a command or a request from the host 590 and forward the command or the request to the memory device 550, or read data from the memory device 550 and forward the data to the host 590. The memory system has a forwarding function with respect to the host 590. The buffer interface 530 may further include components which manage the use, release and addressing of the buffer memory 540.

The random access scheme and the sequential access scheme of the buffer memory 540 will be described below.

The command set of the host 590 may include a command, an address and information regarding a data size. For example, the command set may be READ(ADDR, SIZE-1), WRITE(ADDR, SIZE-1), and so forth. READ and WRITE of the command set may be commands that request the data read operation and data write operation of the memory device 550, respectively. When the memory device 550 is a flash memory, the host 590 may designate a position to write or read data, by an address value for example, a logic block address (LBA), and designate the size of data to read or write. A minimum unit to read or write may be a page for example, 512 bytes or 4K bytes. A maximum size may be defined as N times the minimum unit. For example, in the case of 4K bytes, a data size may be represented by one, two or four of 4K bytes. In the case of 128K bytes, a data size may be represented by 32 of 4K bytes. In this case, commands may be represented as WRITE(0x100, 0), WRITE (0x100, 1), WRITE(0x100, 3) and WRITE(0x100, 31). These may mean transfer of (0+1), (1+1), (3+1) and (31+1) numbers of 4K bytes to a memory region with the address 0x100.

A command set may be fetched by the host interface 520, and be transferred to the processor 510. The processor 510 may analyze a received command set. For example, in the case of a command set of WRITE(0x100, 31), the processor 510 may check consecutive writing of 32 number of 4K byte data to 0x100. Then, the processor 510 may instruct the host interface 520 to store the 32 number of 4K byte data in the buffer memory 540. If the host interface 520 and the buffer interface 530 store all of the corresponding amount of data in the buffer memory 540, the processor 510 may instruct the memory interface 525 and the buffer interface 530 to read data of 128K bytes from the buffer memory 540 and transmit the read-out data to the memory device 550. If the corresponding operation is completed by the memory interface 525, the processor 510 may transmit a response notifying completion of storage of data, to the host 590.

Access schemes of the buffer interface 530 with respect to the buffer memory 540 may be divided into the following two schemes. One scheme may be a scheme of representing the start address of the buffer memory 540 and a data size. The other scheme may be a scheme of dividing the buffer memory 540 by a predetermined unit such as, a slot, for example, N number of slots, which represents a slot number.

Since it is sufficient in the first access method to represent the start address of the buffer memory 540 and a data size, it may be sufficient that the processor 510 transfers only a start address and a data size information to the buffer interface 530 regardless of the size of data for example, 4 KB transfer or 128 KB transfer. The processor 510 may configure a simple command set by only two factors including a start address and a data size regardless of an amount of data to transfer. However, this method may cause fragmentation of the buffer memory 540. For example, the command set from the host 590 may not be interfaced by a normal data size, therefore, fragmentation of a memory may occur as a predetermined time passes. Furthermore, in the case of servicing a new command, it is needed to configure consecutive memories. Therefore, the controller 500 may need a defragmentation operation for collecting completely used regions of the buffer memory 540, and this operation may serve as a load of the processor 510 and degrade the performance of the memory system.

The second access method may be a method of accessing the buffer memory 540 by dividing the buffer memory 540 by a unit that is, a slot. When the controller 500 allocates the minimum unit for example, 4K bytes of the command from the host 590 as the minimum size of the unit that is, a slot, all commands may be represented by N number of slots. Furthermore, when the fragmentation of the buffer memory 540 occurs, because it is fragmentation of the minimum unit for example, a 4K byte unit, the controller 500 may reuse the buffer memory 540 if the position of a slot where fragmentation occurs is known. In the second access method, all commands may be defined as being represented by the numbers of slots for example, N number of 4 KB slots. For example, 128K bytes may be represented by 32 slot numbers, and 1M bytes may be represented by 256 slot numbers. Therefore, the second access method may cause a degradation when using a large number of buffers. To describe the buffers, a corresponding number of slot numbers should be transferred all at once or slots should be transferred by configuring a linked list. Thus, the second access method may serve as a load of the controller 500 for example, loads to some extent exist in the processor 510, the host interface 520 and the memory interface 525, and a calculation for interfacing the slots of the buffer memory 540 may increase.

A memory system in accordance with an embodiment may provide a device and a method capable of solving the fragmentation of a memory and accessing a buffer memory in a simple way.

Figure 7:
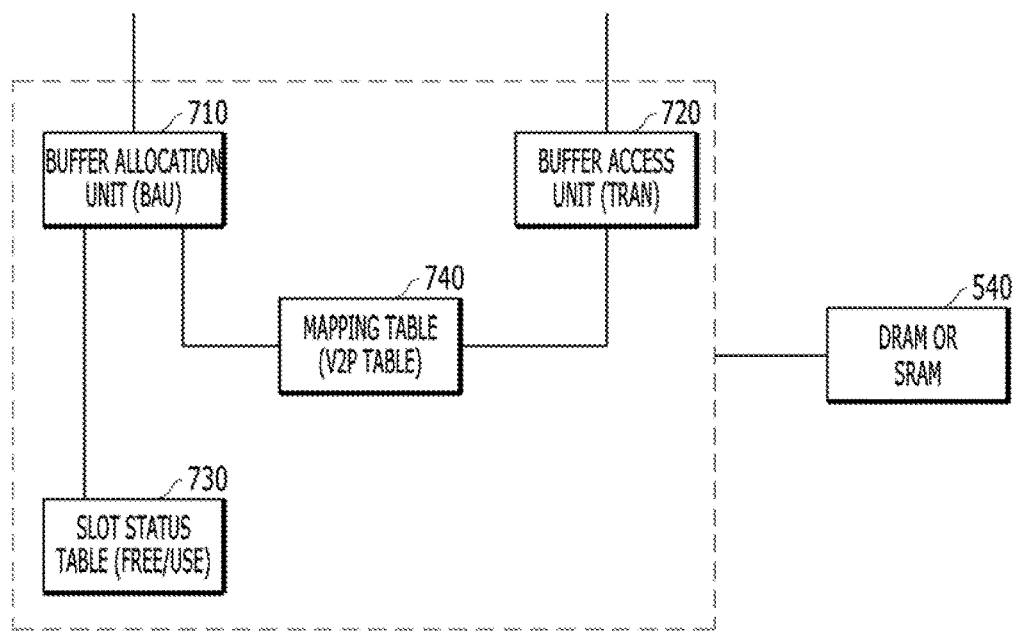
FIG. 7 is a diagram illustrating a buffer interface in accordance with an embodiment.

FIG. 7 is a diagram illustrating a buffer interface in accordance with an embodiment. For example, the buffer interface of FIG. 7 may be a buffer interface 530 of FIG. 5.

Referring to FIG. 7, the buffer interface may include a buffer allocation unit (BAU) 710, a buffer access unit 720, a slot status table 730, and a mapping table 740.

The buffer memory 540 coupled to the buffer interface may include a buffer region where data is accessed by a unit of a slot. The buffer memory 540 may be a DRAM and/or an SRAM. In some embodiments, the slot as the data access unit of the buffer memory 540 may have the same size as the read and write unit for example, a page of the memory device 550. Alternatively, the slot may have a size of N times or 1/N times the read and write unit for example, a page of the memory device 550.

The buffer interface may include the slot status table 730 and the mapping table 740. The slot status table 730 represents the map that is, a free/use slot map of the slot status such as, free or use status of the buffer memory 540. The mapping table 740 represents the mapping relation between virtual slot identification information for example, virtual big buffer identifications (VBIDs) and physical slot identification information for example, physical big buffer identifications (PBIDs).

The buffer allocation unit 710 of the buffer interface may set a start virtual slot identification information that is, start VBID of the mapping table 740 and the virtual number of slots based on a data size. The buffer allocation unit 710 may generate the mapping table 740 by selecting slots of the free status in the slot status table 730 and allocating respectively selected PBIDs of the free status to the positions of last VBIDs corresponding to the virtual number of slots set at the start VBID position of the mapping table 740. That is, the buffer allocation unit 710 may determine the start VBID of the map table 740 and the number of slots based on a data size, select PBIDs of the free status in the slot status table 730, and allocate the selected PBIDs of the free status to the positions of last VBIDs corresponding to the determined number of slots at the start VBID position. The buffer allocation unit 710 may generate the mapping table 740 in which the free PBIDs of the buffer memory 540 are mapped between the start VBID position and the last VBID position of the mapping table 740 corresponding to the data size.

When writing or reading data in or from the buffer memory 540, the buffer access unit 720 may write or read data in or from the buffer memory 540 by the unit of slot by checking the PBIDs of the buffer memory 540 mapped to the set VBIDs of the mapping table 740.

FIG. 8 is a diagram illustrating a slot status table in accordance with an embodiment. For example, the slot status table of FIG. 8 may be the slot status table 730 of FIG. 7.

Referring to FIG. 8, the slot status table may include a first region 810 in which PBIDs are stored and a second region 820 which stores information regarding the free status or use status of corresponding PBIDs. In the slot status table, the number of the PBIDs of the first region 810 may be set to a number corresponding to the size of the buffer memory 540. For example, when the buffer memory 540 has a size of 4M bytes and a slot size is 4K bytes, the number of PBIDs may become 1000. The second region 820 of the slot status table may be set to a use status when data is written in a corresponding PBID of the buffer memory 540. The second region 820 may be set to a free status when the data of a corresponding PBID is read in a read mode. In other words, the buffer allocation unit 710 may update the PBIDs allocated to the mapping table 740 in a data write operation, to the use status, when generating the mapping table 740, and update the PBIDs allocated to the mapping table 740, to the free status, when a read operation for data written in a corresponding PBID is performed.

FIG. 9 is a diagram illustrating a mapping table in accordance with an embodiment. For example, the mapping table of FIG. 9 may be the mapping table 740 of FIG. 7.

Referring to FIG. 9, the reference numeral 910 may be a VBID table which represents the virtual addresses of VBIDs. The VBID table 910 may have a structure in which the numbers of the VBIDs may be written in a region 913 and the virtual addresses of corresponding VBIDs are mapped in a second region 915. The reference numeral 920 may be a PBID table which represents the physical addresses of PBIDs. The PBID table 920 may have a structure in which the numbers of the PBIDs may be written in a region 923 and the physical addresses of the buffer memory 540 corresponding to corresponding PBIDs are mapped in a second region 925. In the VBID table 910 and the PBID table 920, the VBID and PBID addresses may be slot-sized, and the slot sizes of the VBIDs and the PBIDs may have the same size.

The reference numeral 930 may represent an example of configuring a mapping table. In the mapping table, the numbers of VBIDs may be stored in a first region 931, and the PBIDs of corresponding VBIDs may be stored in a second region 935. The stored PBIDs may be PBIDs of the free status. That is, the mapping table 930 may include the first region 931 in which VBIDs having sequential numbers are stored and the second region 935 in which PBIDs of the free status selected by the buffer allocation unit 710 of FIG. 7 are stored by being mapped. The first region 931 of the mapping table 740 may have a ring buffer structure in which VBIDs have sequential numbers. The number N of slots of VBIDs may be set to be greater than the number M of slots of PBIDs. For example, the number N of slots of VBIDs may be a size that is an integer times the number M of slots of PBIDs.

Referring again to FIG. 7, the buffer interface may include the buffer allocation unit (BAU) 710 and the buffer access unit or virtual address translation unit (TRAN) 720. The buffer allocation unit 710 may provide a VBID which is configured by N number of slots. The buffer access unit 720 may access the buffer memory 540 by translating a virtual address into a physical address. The buffer interface may improve deficiencies of a buffer structure of consecutive addressing and a buffer structure of accessing unit slots. The buffer interface may designate consecutive addressing of the buffer memory 540 by a start address and a size while not needing defragmentation. Furthermore, the buffer interface may manage the buffer memory 540 by a slot unit while not needing N number of descriptors or a linked list, thereby avoiding an overhead that causes performance deterioration.

The buffer memory 540 may support a maximum N number such as, a 8K number, TBD by the slot configuration of 4 KB. The respective slots of the buffer memory 540 may be divided into buffer slot IDs (BIDs), and the numbering of BID may have an absolute relationship with the physical address of the buffer memory 540. For example, the buffer memory 540 may be set to a base address (=0x0). For example, when a slot size has the size of 4K bytes, it may be mentioned that BID=3 starts at 0x6000.

Referring again to FIG. 5, the buffer management method of the buffer interface 530 in accordance with the embodiment may be basically a scatter and gathering scheme, and may have a structure in which each buffer slot is requested at a required time and is recovered after occupying a non-uniform time. Namely, the request and recovery of a buffer slot may be completely random when viewed from the standpoint of a BID. For example, when a host write is performed in the host interface 520, even in the case where the access method of the buffer memory 540 is the sequential write scheme, the BID sequence written in a buffer has no relationship with the number thereof, and a BID may play simply the role of an ID for finding a physical address.

In the BID configuration, in order to represent consecutiveness of data, two methods may be possible. In one method, by causing an element on a coupled list to have a BID through a linked list, consecutiveness may be represented. In the other method, as a subject processing one link checks a next link and this is used as an address, consecutive accessing may be performed. The method of checking links as described above may induce overheads of the host interface 520, the processor 510 and the memory interface 525 as described above. The buffer interface 530 in accordance with the embodiment may use a method for translating the physical address of the buffer memory 540 into a virtual address. A physical address and a virtual address may be calculated by a physical BID (PBID) and a virtual BID (VBID), respectively.

Referring again to FIG. 7, the buffer allocation unit 710 may perform a buffer slot management function. The buffer allocation unit 710 may allocate an optional PBID among free slots to the map table 740 by referring to the slot status table 730. The buffer allocation unit 710 may allocate VBIDs which may one-to-one correspond to PBIDs of free slots allocated as shown by the reference numeral 930 of FIG. 9. The scheme of allocating PBIDs may be a method of selecting PBIDs of the free status in the slot status table 730 which stores a free slot map or a free block list, and the scheme of causing VBIDs to correspond to PBIDs may be simply a count method for example, an incremental counter. Namely, VBIDs may be allocated while up-counting VBIDs in the map table 740, as shown by the reference numeral 930 of FIG. 9, and may roll back to 0, a zeroth VBID when they are increased to a maximum VBID number an $N^{th}$ VBID.

A VBID may be described as a sequence ID on an operation. For example, a VBID may be regarded as the sequence ID of the buffer memory 540 that is, a buffer sequence ID in a write operation. When every write is sequenced, an actual PBID may be regarded as random in the limited buffer memory 540 that is, a total buffer pool, data written in the buffer memory 540 may have a change in its meaning, and this change may be a VBID.

FIG. 10 is a diagram illustrating an example of a mapping table in the buffer interface of the memory system in accordance with an embodiment. In FIG. 10, the reference numeral 1010 illustrates an example of allocated PBIDs and physical addresses. The reference numeral 1020 illustrates an example of VBIDs and virtual addresses. The reference numeral 1030 illustrates an example of configuring a mapping table. For illustration purposes only, FIG. 10 shows an example in which the buffer region of the buffer memory 540 of FIG. 5 is configured by 8 slots and the number of VBIDs is two times the number of PBIDs.

With reference to FIGS. 5, 7 and 10, a host write operation will be described below. First, the host interface 520 may fetch a write command from the host 590, and receive data for which a buffer write operation is performed with regard to the write command. When a data size included in a write command set is 32K bytes, the buffer interface 530 may allocate buffers of 32 KB, that is, 8 slots of 4 KB. The buffer allocation unit 710 of the buffer interface 530 may select free slots by referring to the slot status table 730. If selected PBIDs are the same as {7, 0, 1, 4, 2, 6, 5, 3}, addresses may be changed by the unit of 4K bytes. The buffer interface 530 may set or number a buffer sequence for a corresponding write command, and perform a buffer access operation based on the buffer sequence. An actual operation may be defined as an operation for N number of consecutive sequences from the buffer sequence number of BID=7. That is, the operation may be performed such that BID=7 is a first sequence of the write command, BID=0 is a second sequence and BID=1 is a third sequence. If it is possible to allocate the number of a sequence for each BID, the buffer interface 530 may designate consecutive buffer slots. Such a sequence number may be a VBID number. Therefore, the buffer allocation unit 710 may set and manage sequences for all the write commands issued by the host interface 520. The buffer allocation unit 710 may generate the mapping table 740 in which the addresses of the buffer memory 540 are designated according to the above sequences. The buffer access unit 720 may write data in the buffer memory 540 by referring to the mapping table 740.

If the buffer interface 530 sets information on a sequence number of a first buffer for example, a start VBID and N number of consecutive buffer sequences for a write command or a read command, it may be regarded that the description of the buffer memory 540 is set.

Referring again to FIG. 10, illustrated is an example of a table in which the buffer region of the buffer memory 540 is configured by 8 physical slots and 16 virtual slots, a physical scattered to virtual ring mapping table with 16 BIDs. The reference numeral 1010 illustrates an example of addresses of physical slots that is, physical addressing. The reference numeral 1020 illustrates an example of addresses of virtual slots that is, virtual addressing. The reference numeral 1030 illustrates an example of a table in which virtual slots and physical slots are mapped that is, a virtual to physical mapping table or a V2P mapping table.

In FIG. 10, PBIDs may be IDs for 8 buffers from 0 to 7, and VBIDs may be values between 0 and 15. A physical address may be obtained by multiplying a PBID and a buffer slot size that is, a slot size allocated to the buffer memory 540. A virtual address may be obtained by multiplying a VBID and a slot size. The slot size of a PBID and the slot size of a VBID may be the same size. The buffer allocation unit 710 of the buffer interface 530 may set a slot sequence by calculating the number of VBID slots based on a start VBID and a data size when a write command or a read command is received. Further, the buffer allocation unit 710 may select free PBIDs of a number corresponding to the number of slots among PBIDs of the free status in the slot status table 730, and map the selected free PBIDs to a preset VBID slot sequence set.

In FIG. 10, a first buffer sequence 1041 illustrates an example of a buffer sequence that is configured by 8 slots. A second buffer sequence 1043 illustrates an example of a buffer sequence that is configured by 4 slots. A PBID sequence in the first buffer sequence 1041 shows an example having the sequence of 7,0,1,4,2,6,5,3. A PBID sequence in the second buffer sequence 1043 shows an example having the sequence of 3,0,2,5. Moreover, in FIG. 10, t shows a time flow. At a time t0, when PBID=7 is allocated, VBID=0 may be mapped. At a time t1, when PBID=0 is allocated, VBID=1 may be mapped. In this way, a PBID may be selected randomly among free slots like an optional ID value under N, and a VBID may have a configuration that is increased by 1 within a range of not exceeding 2N or 4N at the maximum and corresponds one-to-one to the PBID. The VBID has the size or depth of 2N of a PBID as indicated by the reference numeral 1045 of FIG. 10 and may mean that a time at which a PBID corresponding to a VBID becomes actually a free slot allows a distance of 2N−1. When a VBID corresponding to the distance of 2N−1 or 4N−1 is allocated, if a previous PBID having existed at that position is not released, the buffer allocation unit 710 may be restricted from buffer allocation. Hence, the buffer allocation unit 710 may manage the mapping table 740 that is, a V2P mapping table which represents a relationship between an optional PBID to be allocated and a VBID of a ring buffer type mapped thereto, and perform an operation of tracing used BIDs.

Figure 11A:
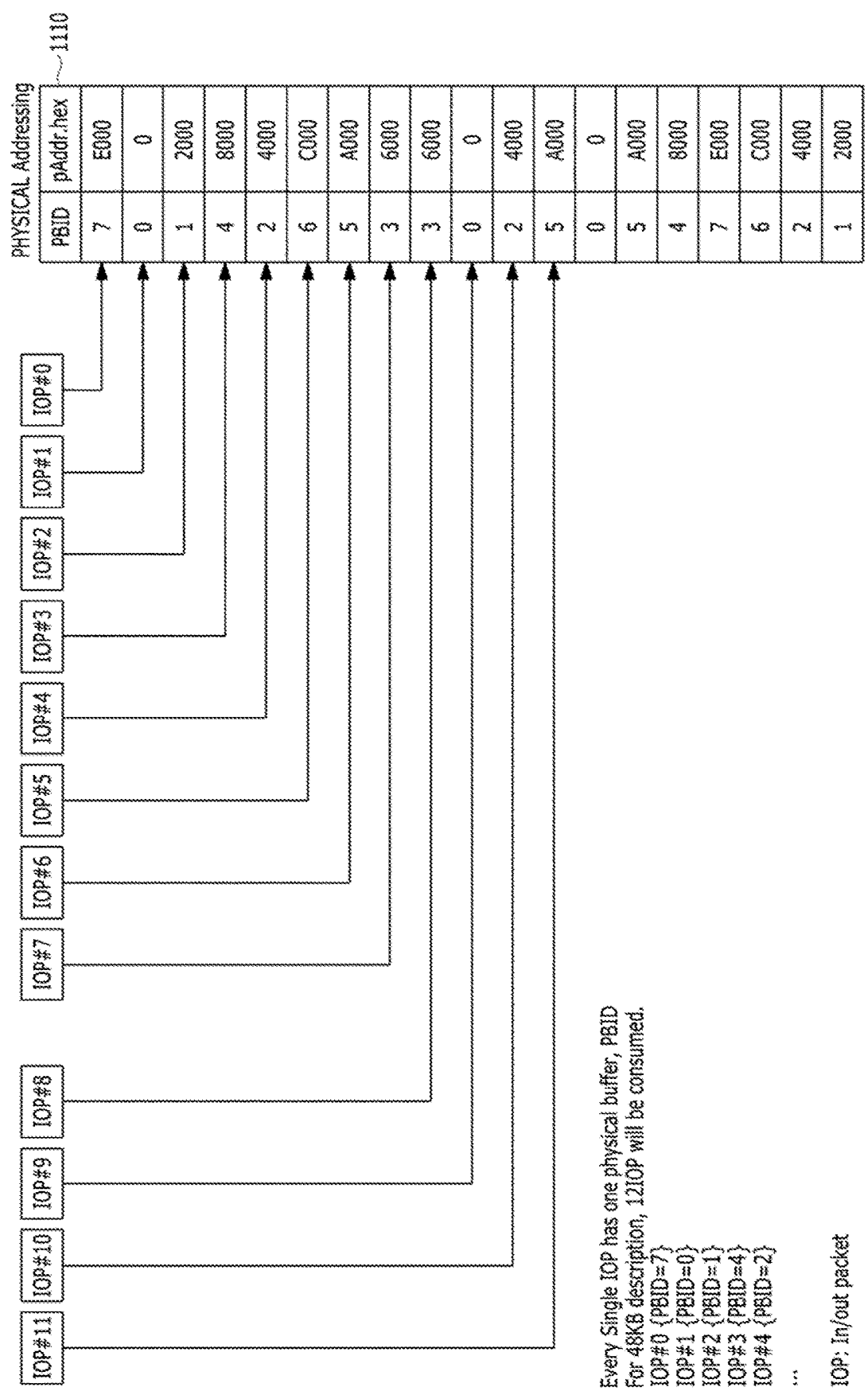
FIGS. 11A and 11B are diagrams illustrating examples of a buffer access operation.
Figure 11B:
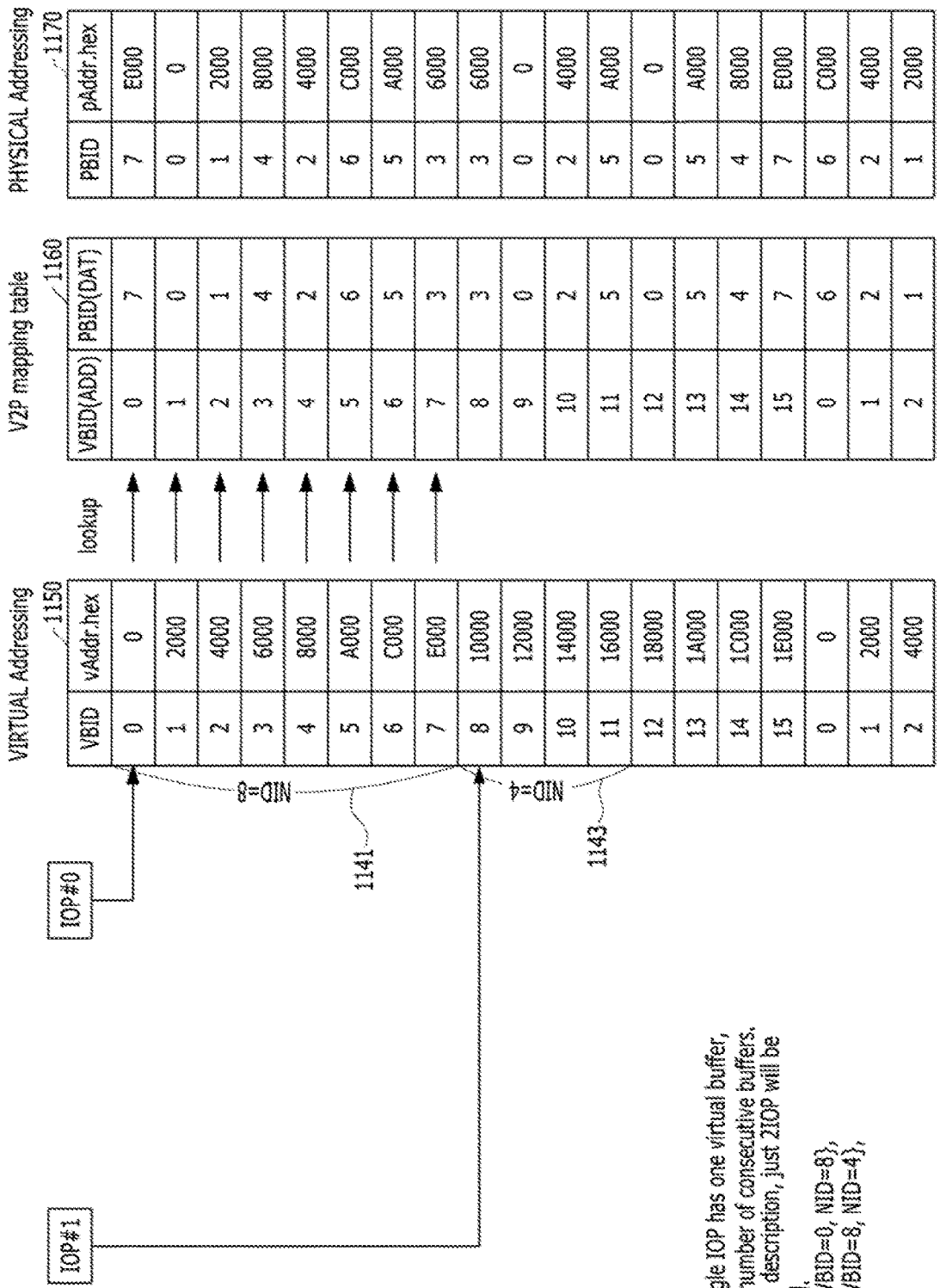

FIGS. 11A and 11B are diagrams illustrating examples of a buffer access operation. FIG. 11A is a drawing illustrating an example in which addressing of the buffer memory 540 of FIG. 5 is performed sequentially for example, physical 4 KB buffer description: scatter & gather buffers by linked list. FIG. 11B is a drawing illustrating a buffer access example in accordance with the embodiment such as, virtual big-buffer description; ring buffers with virtual pointer.

FIG. 11A shows a scheme of configuring an in/out package (IOP) list in a buffer allocation scheme having a 4K byte basis. An IOP publisher may request a buffer slot by the unit of 4 KB, and bind the buffer slot to each IOP. To allocate buffer slots of 32K bytes, 8 buffer slot indexes may be bound to 8 IOPs. The 8 buffer slots bound to the 8 IOPs may be used by an operation such as write/read, and may be released at respective times. If a request of 16K bytes is issued after a request of 32K bytes, the IOP publisher may receive 4 buffer slot indexes and couple them again to 4 IOPs. At this time, since the buffer slots used in the preceding 8 IOPs are released and allocated again, PBID=3, 0, 2, 5 may be reused.

When using directly PBIDs as in FIG. 11A, to represent data of 32K bytes, a context associated with 8 4 KB buffer slots results, and a representation such as PBID sequence={7, 0, 1, 4, 2, 6, 5, 3} should be possible. When representing this by addresses, physical addresses {E000, 0, 2000, 8000, 4000, C000, A000, 6000} may be represented as indicated by the reference numeral 1110 of FIG. 11A.

By performing the buffer access operation as shown in FIG. 11A through VBIDs, a buffer access operation may be performed in a method as shown in FIG. 11B. The buffer allocation unit 710 of the buffer interface 530 may represent only a start address that is, a start address of a VBID and the number of slots that is, the number of VBIDs (NID) when performing the access operation of the buffer memory 540. For example, first IOP (IOP #0)={VBID=0, NID=8} as indicated by the reference numeral 1141 of FIG. 11B, and second IOP (IOP #1)={VBID=8, NID=4} as indicated by the reference numeral 1143 of FIG. 11B. Namely, the first IOP (IOP #0) should obtain total 8 buffer slots for write or read, and 8 VBID IDs may be used with a start VBID=0. This may become virtual addresses {0, 2000, 4000, 6000, 8000, A000, C0000, E000} as indicated by the reference numeral 1150 of FIG. 11B. Thereafter, the buffer allocation unit 710 may select 8 free status PBIDs in the slot status table 730, and map the selected PBIDs to the mapping table 740 as indicated by the reference numeral 1160 of FIG. 11B. The physical addresses of the PBIDs mapped to VBIDs may be set in advance as indicated by the reference numeral 1170 of FIG. 11B.

Therefore, when compared to the buffer access operation as in FIG. 11A, in the buffer access method as in FIG. 11B, an overhead of managing 12 IOPs and individual BIDs may be simply represented by 2 IOPs and 2 VBID start pointers.

The buffer access method in accordance with the embodiment may include a buffer allocation operation which determines the start identification information of virtual slots of a buffer memory and the number of slots by analyzing the size of data when a command is received, and maps physical slots to the determined virtual slots. Also, the buffer access method may include a buffer access operation which accesses the data of the positions of the allocated physical slots of the buffer memory.

Figure 12:
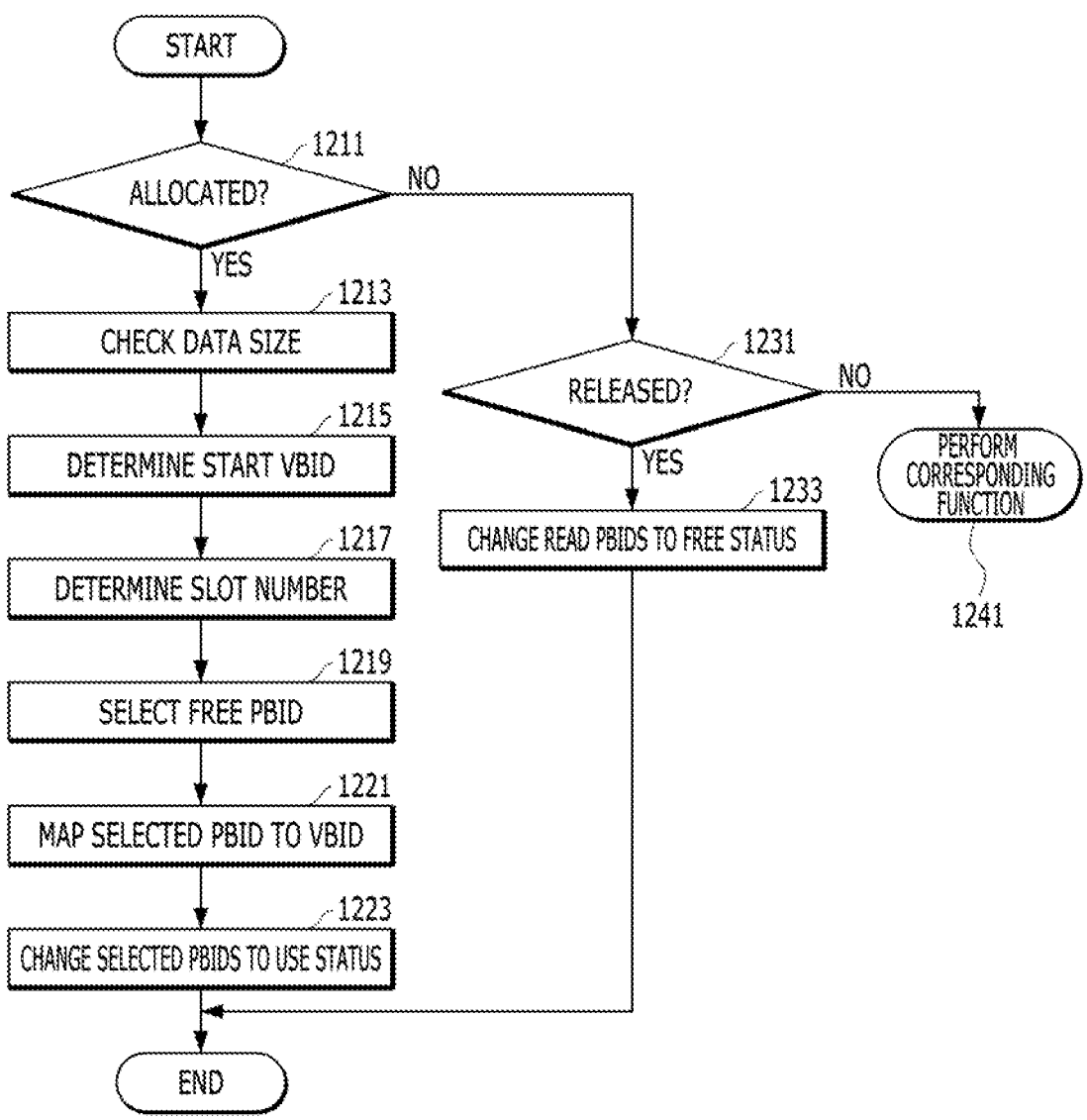
FIG. 12 is a flow chart illustrating a buffer allocation operation in accordance with an embodiment.
Figure 13:
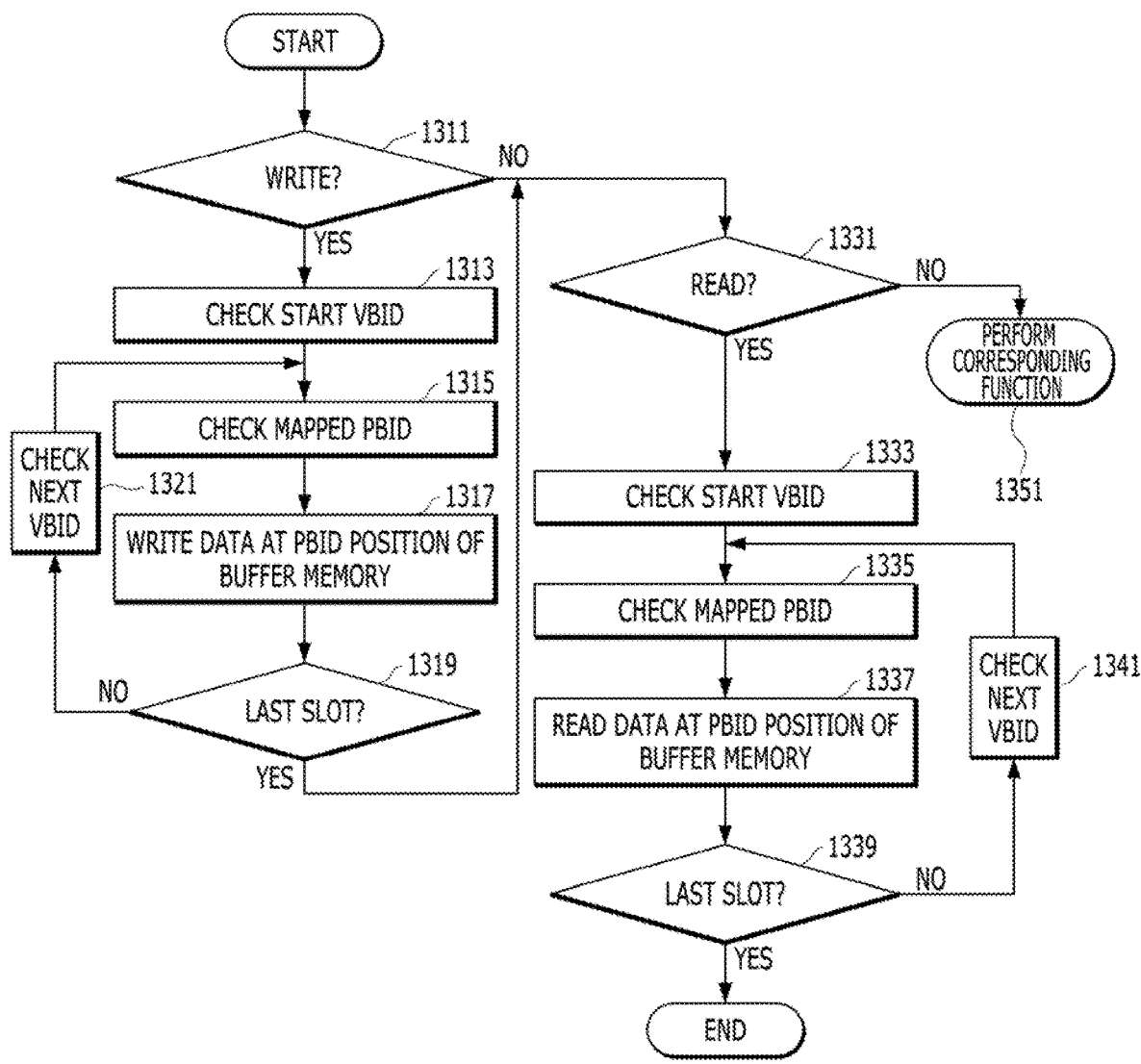
FIG. 13 is a flow chart illustrating a buffer access operation in accordance with an embodiment.

FIG. 12 is a flow chart illustrating a buffer allocation operation in accordance with an embodiment. FIG. 13 is a flow chart illustrating a buffer access operation in accordance with an embodiment. FIGS. 12 and 13 may be the operations of the buffer interface 530 of FIGS. 5 and 7. FIG. 12 may be the operation of the buffer allocation unit 710 of the buffer interface 530. FIG. 13 may be the operation of the buffer access unit 720 of the buffer interface 530.

Referring to FIG. 12, when an access command of the buffer memory 540 is received, the buffer interface 530 may check whether the access command is a write command of the buffer memory 540, at step 1211. If the access command is a write command, the buffer interface 530 may recognize this at step 1211, and may check the size of data to write in the buffer memory 540, at step 1213. The buffer interface 530 may set a start VBID of the mapping table 740 at step 1215, and determine the number of slots based on the data size at step 1217. A VBID having an earliest number among VBIDs to which PBIDs are not mapped in the mapping table 740 may be determined as the start VBID. For example, in the case of IOP #0 in FIG. 11B, since there is no VBID to which a PBID is mapped currently in the mapping table 740, a start VBID may be a VBID 0, and the size of data to write in the buffer memory 540 may be the slot number of 8 having the size of 8 buffer slots. In this case, the buffer interface 530 may be set to {start VBID=VBID 0, NID=8}. In the case of IOP #1 in FIG. 11B, since the number of VBIDs to which PBIDs are mapped currently in the mapping table 740 are 8 that is, from VBID 0 to VBID 7, a start VBID may be a VBID 8, and the size of data to write in the buffer memory 540 may be the slot number of 4 having the size of 4 buffer slots. In this case, the buffer interface 530 may be set to {start VBID=VBID 8, NID=4).

Thereafter, the buffer interface 530 may select PBIDs of the free status in the slot status table 730 at step 1219, and map the selected PBIDs to VBIDs at step 1221. Then, at step 1223, the buffer interface 530 may transition the status of the selected PBIDs to the use status in the slot status table 730.

When selecting PBIDs of the free status in the slot status table 730, the buffer interface 530 may select sequentially free slot numbers of the free status, and randomly select the free slot numbers. FIG. 11B illustrates an example in which VBIDs are set to {start VBID=0, NID=8} and PBIDs are selected in the sequence of {7,0,1,4,2,6,5,3} in the case of IOP #0, and illustrates an example in which VBIDs are set to {start VBID=8, NID=4} and PBIDs are selected in the sequence of {3,0,2,5} In the case of IOP #1. If the buffer interface 530 maps the selected PBIDs of the free status to the VBIDs set based on the start VBID and the size of data, the mapping table 740 may be generated as indicated by the reference numeral 1160 of FIG. 11B.

If the buffer interface 530 reads data written in the buffer memory 540, the status of the PBID from which data is read, in the buffer memory 540, may be released to the free status. If data written in the buffer memory 540 is read, the read region that is, PBID slot may be written again with another data. Therefore, if data are read from the buffer memory 540, the buffer interface 530 may recognize a read operation at step 1231. After checking PBIDs of the buffer memory 540 from which data are read, the buffer interface 530 may transition the corresponding PBIDs to the free status in the slot status table 730 at step 1233.

Referring to FIG. 13, the buffer interface 530 may write data in the buffer memory 540 or read data written in the buffer memory 540, based on a command and the information of the mapping table 740. If the command is a command for writing data in the buffer memory 540, the buffer interface 530 may recognize this at step 1311, and check the start VBID and NID of a buffer slot sequence in the mapping table 740 at step 1313. The buffer interface 530 may check PBIDs mapped to the VBIDs in the mapping table 740, and write data at the physical address positions of the corresponding PBIDs in the buffer memory 540 at step 1317. After writing data in the buffer memory 540, the buffer interface 530 may check the VBIDs of a next position in the mapping table 740 at step 1321 when a corresponding slot is not a last slot, and check checked PBIDs by proceeding to the step 1315. For example, in the case of IOP #0 in FIG. 11B, in the mapping table 740, PBID=7,0,1,4,2,6,5,3 may be mapped to 8 slots (NID=8) from the start VBID (VBID=0). The buffer interface 530 may repeatedly perform the steps 1313 to 1321, check sequentially the PBIDs (PBID=7,0,1, 4,2,6,5,3) mapped to the VBID 0 to VBID 7, and write data at the physical addresses of the buffer memory 540 corresponding to the checked PBIDs. Thereafter, if data is written at the physical address of the PBID for example, PBID=3 of the last VBID for example, VBID=7, the buffer interface 530 may end a write operation at step 1319.

After writing data in the buffer memory 540, the buffer interface 530 may successively perform a read operation. For example, data written in the buffer memory 540 may be data buffered to be stored in the memory device 550. In this case, the data written in the buffer memory 540 may be transferred to the memory device 550 as a read operation is performed after a write operation is ended. If a read operation is performed, the buffer interface 530 may recognize this at step 1331, and check the start VBID of a buffer slot sequence to read in the mapping table 740 at step 1333. After checking the start VBID, the buffer interface 530 may check a PBID mapped to the start VBID at step 1335, and read data written at the physical address of the buffer memory 540 corresponding to the corresponding PBID at step 1337. Thereafter, the buffer interface 530 may check a next VBID of the buffer slot sequence at step 1341, and check a PBID mapped to the checked VBID by proceeding to the step 1335. If data written in the buffer memory 540, corresponding to a last PBID of the buffer slot sequence in the mapping table 740, is read, the buffer interface 530 may recognize at step 1339 that data of a last slot is read, and end the read operation of the buffer memory 540.

Figure 14:
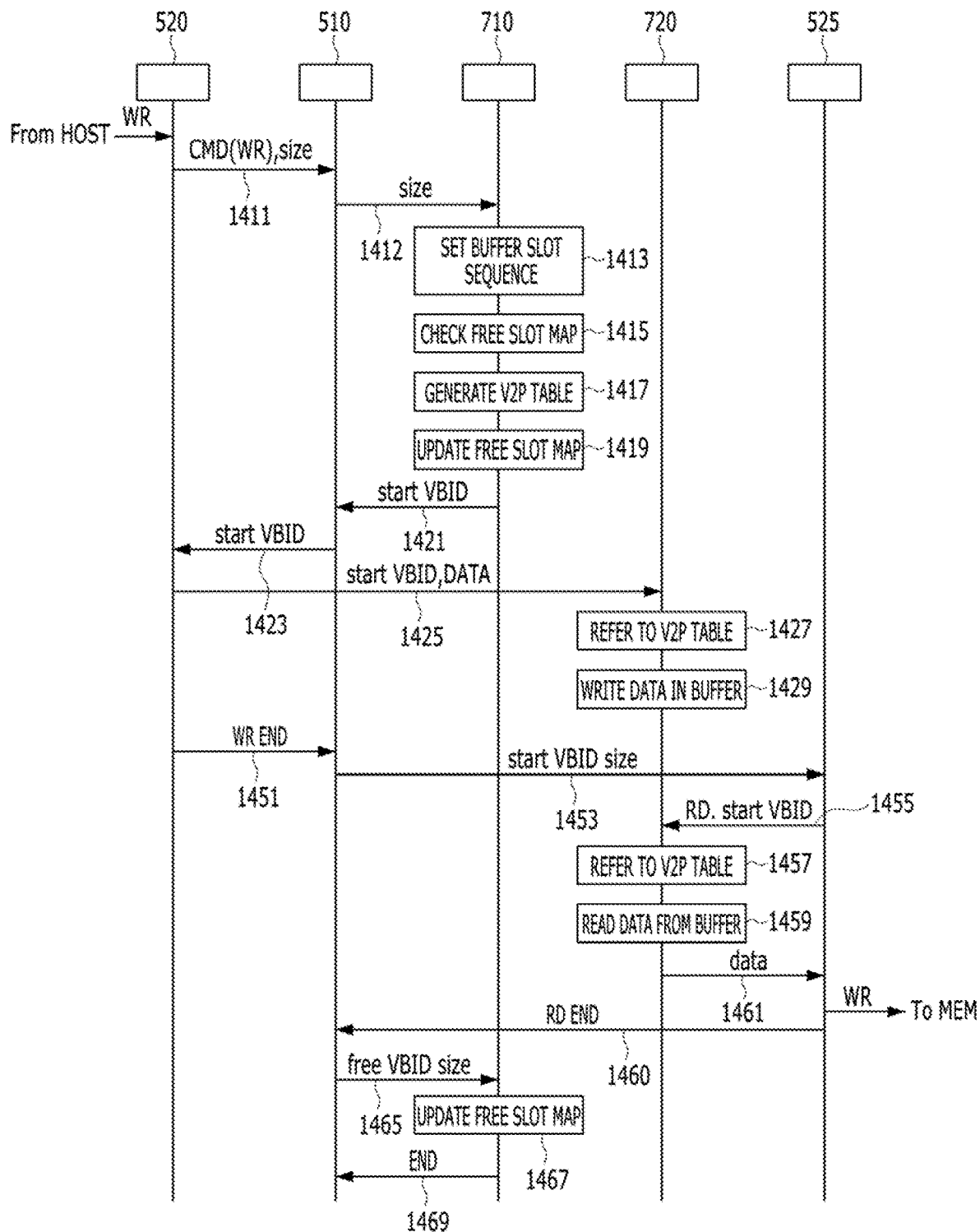
FIG. 14 is a diagram illustrating an operation for writing data in the memory device of the memory system in accordance with an embodiment.

FIG. 14 is a diagram illustrating an operation of writing data in the memory device of the memory system in accordance with an embodiment.

Referring to FIG. 14, the memory system may receive a command such as, a write command WR for writing data in the memory device 550, an address and data from the host 590. The host interface 520 may transmit the command and information regarding a data size to the processor 510 at step 1411. The processor 510 may transmit information regarding the data size to the buffer allocation unit 710 at step 1412. Upon receiving information regarding the data size, the buffer allocation unit 710 may set a buffer slot sequence information by analyzing information regarding the data size at step 1413. The buffer slot sequence information may include a start VBID of the mapping table 740 or a start VBID of the mapping table 740 and the number of slots (NID). The buffer allocation unit 710 may select PBIDs of the free status by the preset number of slots that is, the number of slots corresponding to NID in the slot status table 730 at step 1415, and generate a mapping table 740 by mapping the selected PBIDs to VBIDs configuring the buffer slot sequence at step 1417. Thereafter, the buffer allocation unit 710 may transition the PBIDs allocated in the mapping table 740, to the use status in the slot status table 730. Thereafter, the buffer allocation unit 710 may transmit a buffer slot sequence information including the start VBID allocated in the mapping table, at step 1421. The buffer slot sequence information may be information including the start VBID or information including the start VBID and NID. The processor 510 may transmit the buffer slot sequence information to the host interface 520 at step 1423.

Upon receiving the buffer slot sequence information, the host interface 520 may transmit the buffer slot sequence information including start VBID and data to the buffer access unit 720 at step 1425. The buffer access unit 720 which receives the buffer slot sequence information and the data may check PBIDs in the mapping table 740 based on the buffer slot sequence information at step 1427, and write the received data at the PBID addresses of the buffer memory 540 at step 1429.

Upon completion of transmission of data that is, the end of write to the buffer access unit 720, the host interface 520 may transfer this to the processor 510 at step 1451, and the processor 510 may transfer the buffer slot sequence information including start VBID to the memory interface 525 at step 1453. The memory interface 525 which receives the buffer slot sequence information VBID may transmit a read command RD and the buffer slot sequence information including start VBID to the buffer access unit 720 at step 1455. The buffer access unit 720 which receives the read command RD and the buffer slot sequence information VBID may check PBIDs in the mapping table 740 based on the buffer slot sequence information including start VBID at step 1457, read the data written at the PBID addresses of the buffer memory 540 at step 1459, and transmit the read-out data to the memory interface 525 at step 1461. The memory interface 525 may write the data from the buffer access unit 720, in the memory device 550.

Upon completion of storage of data in the memory device 550, the memory interface 525 may notify the processor 510 that storage of data is completed or ended, at step 1461. Upon detecting the completion of data storage in the memory device 550, the processor 510 may notify the buffer allocation unit 710 with the buffer slot sequence information including free VBID, at step 1465. The buffer allocation unit 710 may check PBIDs in the mapping table 740 based on the buffer slot sequence information VBID and transition the checked PBIDs to the use status in the slot status table 730 at step 1467, and notify the processor 510 of this at step 1469.

Figure 15:
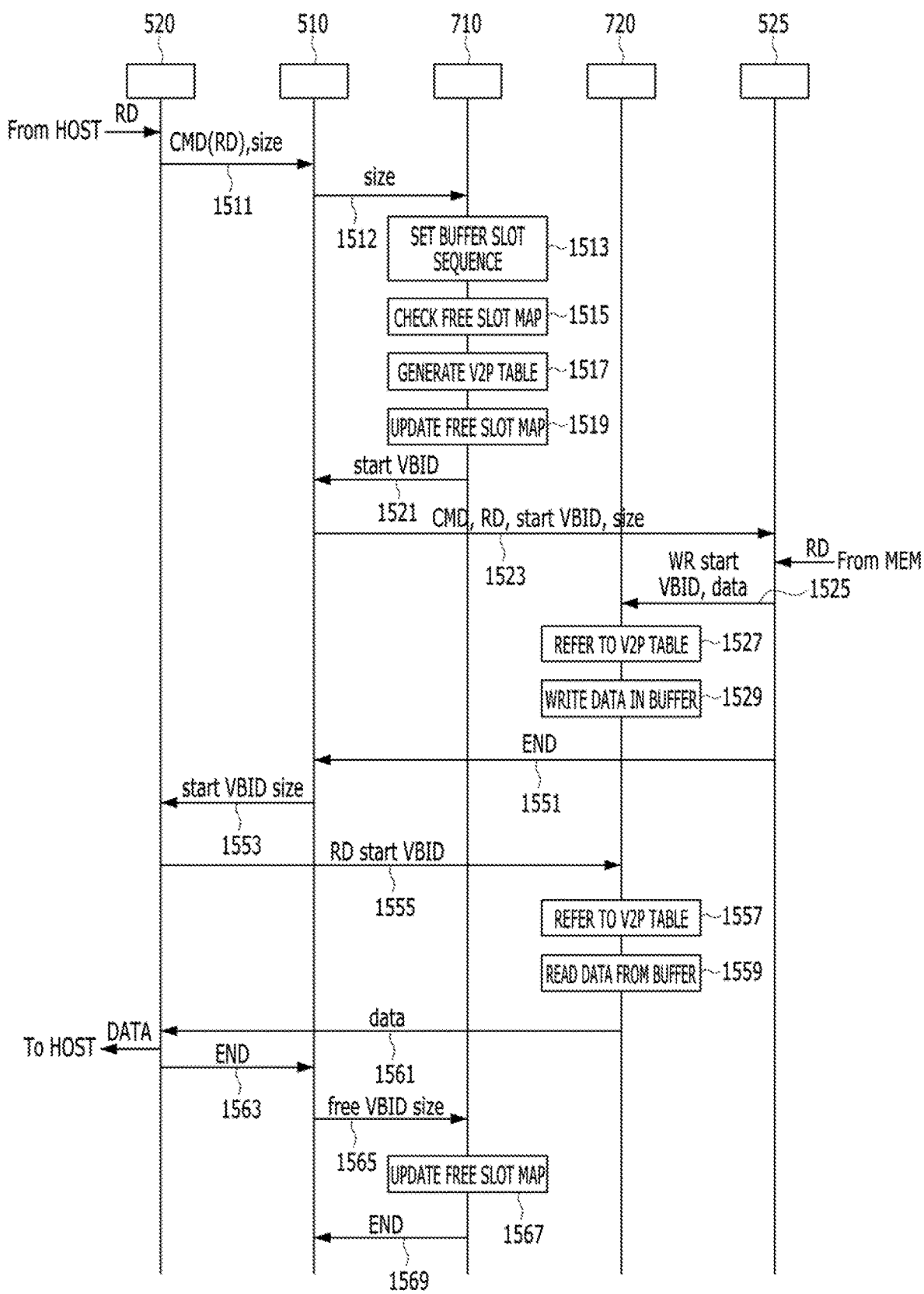
FIG. 15 is a diagram illustrating an operation for reading data from the memory device in the memory system in accordance with an embodiment.

FIG. 15 is a diagram illustrating an operation for reading data from the memory device in the memory system in accordance with an embodiment.

Referring to FIG. 15, the memory system may receive a command such as, a read command RD for reading data written in the memory device 550, an address and information regarding a data size from the host 590. The host interface 520 may transmit the command and information regarding the data size to the processor 510 at step 1511. The processor 510 may transmit information regarding the data size to the buffer allocation unit 710 at step 1512. Upon receiving information regarding the data size, the buffer allocation unit 710 may set a buffer slot sequence information by analyzing information regarding the data size at step 1513. The buffer slot sequence information may include a start VBID of the mapping table 740 or a start VBID of the mapping table 740 and the number of slots (NID). The buffer allocation unit 710 may select PBIDs of the free status by the preset number of slots such as, the number of slots corresponding to NID in the slot status table 730 at step 1515, and generate a mapping table 740 by mapping the selected PBIDs to VBIDs configuring the buffer slot sequence at step 1517. Thereafter, the buffer allocation unit 710 may transition the PBIDs allocated in the mapping table 740, to the use status in the slot status table 730 at step 1519. Thereafter, the buffer allocation unit 710 may transmit a buffer slot sequence information including the start VBID allocated in the mapping table, at step 1521. The buffer slot sequence information may be information including the start VBID or information including the start VBID and NID. The processor 510 may transmit to the memory interface 525, the read command, an address information for reading data stored in the memory device 550 and the slot sequence information for the buffer interface 530 to access the buffer memory 540, at step 1523. The memory interface 525 may read data from the memory device 550.

The memory interface 525 may transmit the buffer slot sequence information including start VBID and the data read from the memory device 550, to the buffer access unit 720, at step 1525. The buffer access unit 720 which receives the buffer slot sequence information including start VBID and the data may check PBIDs in the mapping table 740 based on the buffer slot sequence information at step 1527, and write the received data at the PBID addresses of the buffer memory 540 at step 1529.

Upon completion or end of transmission of the data read from the memory device 550, to the buffer access unit 720, the memory interface 525 may transfer this end to the processor 510 at step 1551, and the processor 510 may transfer the buffer slot sequence information including start VBID to the host interface 520 at step 1553. The host interface 520 which receives the buffer slot sequence information including start VBID may transmit a read command RD and the buffer slot sequence information including start VBID to the buffer access unit 720 at step 1555. The buffer access unit 720 which receives the read command RD and the buffer slot sequence information including start VBID may check PBIDs in the mapping table 740 based on the buffer slot sequence information including start VBID at step 1557, read the data written at the PBID addresses of the buffer memory 540 at step 1559, and transmit the read-out data to the host interface 520 at step 1561. The host interface 520 may transmit the data from the buffer access unit 720, to the host 590.

Upon completion of transmission of the read-out data to the host 590, the host interface 520 may notify the processor 510 that transmission of data is completed or ended, at step 1563. Upon detecting the completion of the transmission of the data read from the memory device 550, the processor 510 may notify the buffer allocation unit 710 with the buffer slot sequence information including free VBID, at step 1565. The buffer allocation unit 710 may check PBIDs in the mapping table 740 based on the buffer slot sequence information and transition the checked PBIDs to the use status in the slot status table 730 at step 1567, and notify the processor 510 of this at step 1569.

Hereinbelow, detailed descriptions will be made with reference to FIGS. 16 to 21, for a data processing system and electronic appliances to which the memory system 110 including the memory device 150 and the controller 130 described above with reference to FIGS. 1 to 15, according to the embodiment, is applied.

Figure 16:
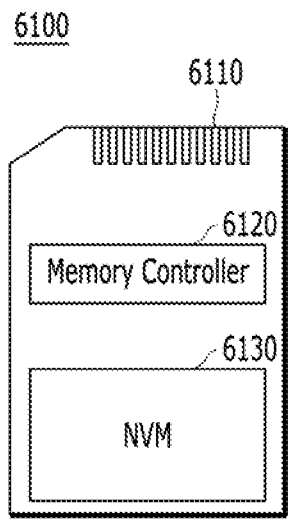
FIGS. 16 to 21 are block diagrams illustrating other examples of the data processing system including the memory system in accordance with the embodiment of the present invention.

FIG. 16 is a diagram illustrating a data processing system including the memory system according to the embodiment. Specifically, FIG. 16 illustrates a memory card system 6100 employing the memory system according to an embodiment.

Referring to FIG. 16, the memory card system 6100 may include a memory controller 6120, a memory device 6130, and a connector 6110.

The memory controller 6120 may be operatively connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown). The memory controller 6120 may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device for example, the host 102 described above with reference to FIG. 1, through the connector 6110. For example, as described above with reference to FIG. 1, the memory controller 6120 may be configured to communicate with the external device through at least one of various communication protocols such as a universal serial bus (USB), a multimedia card (MMC), an embedded MMC (eMMC), a peripheral component interconnection (PCI), a PCI-express (PCIe), an Advanced Technology Attachment (ATA), a Serial-ATA, a Parallel-ATA, a small computer system interface (SCSI), an enhanced small disk interface (ESDI), an Integrated Drive Electronics (IDE), a Firewire, universal flash storage (UFS), wireless-fidelity (WI-FI) and a Bluetooth. The memory system and the data processing system may be applied to wired and/or wireless electronic appliances, for example, a mobile electronic appliance.

The memory device 6130 may be implemented with a nonvolatile memory (NVM). For example, the memory device 6130 may be implemented with one of various nonvolatile memory devices such as, for example, an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state drive (SSD) by being integrated into a single semiconductor device. The memory controller 6120 and the memory device 6130 may construct a memory card such as a PC card for example, a Personal Computer Memory Card International Association (PCM-CIA), a compact flash card (CF), a smart media card for example, SM and SMC, a memory stick, a multimedia card for example, MMC, RS-MMC, MMCmicro and eMMC, an SD card for example, SD, miniSD, microSD and SDHC and a universal flash storage (UFS).

Figure 17:
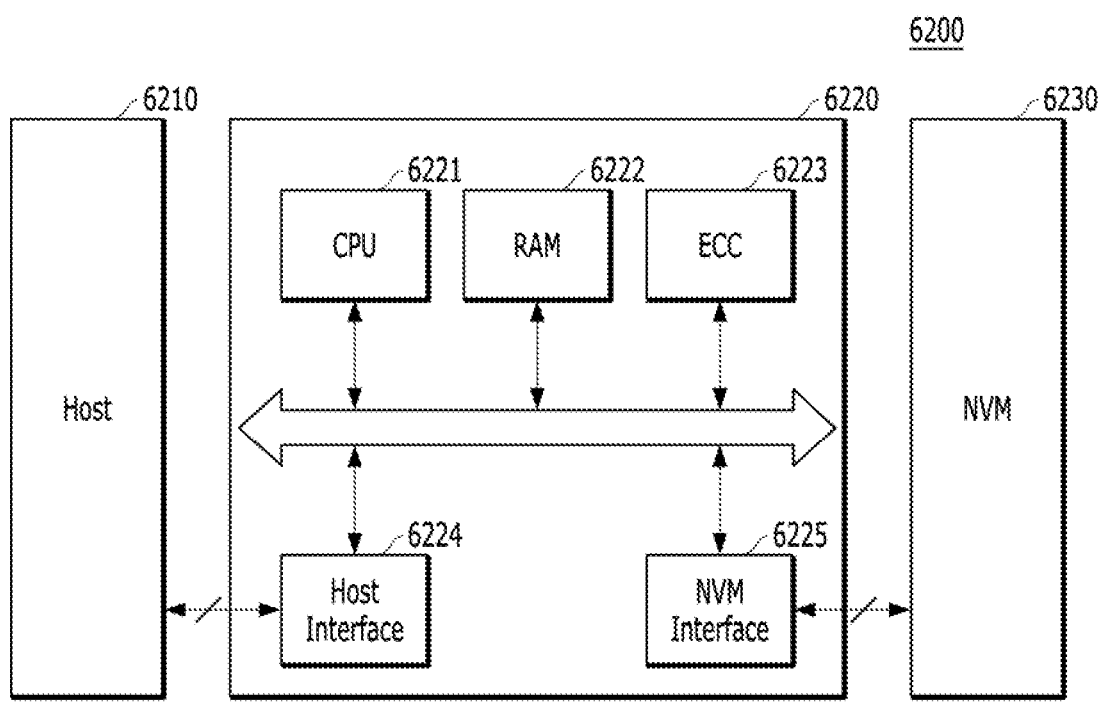

FIG. 17 is a diagram schematically illustrating an example of a data processing system 6200 including a memory system according to an embodiment of the present invention.

Referring to FIG. 17, the data processing system 6200 may include a memory device 6230 which may be implemented with at least one nonvolatile memory (NVM) and a memory controller 6220 for controlling the memory device 6230. The data processing system 6200 may be a storage medium such as a memory card for example, CF, SD and microSD, as described above with reference to FIG. 1. The memory device 6230 may correspond to the memory device 150 in the memory system 110 described above with reference to FIG. 1. The memory controller 6220 may correspond to the controller 130 in the memory system 110 described above with reference to FIG. 1.

The memory controller 6220 may control the operations for the memory device 6230 including read, write and erase operations in response to requests received from a host 6210. The memory controller 6220 may include at least one of a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. When the RAM 6222 is used as a work memory, data processed by the CPU 6221 is temporarily stored in the RAM 6222. When the RAM 6222 is used as a buffer memory, the RAM 6222 is used to buffer data to be transmitted from the host 6210 to the memory device 6230 or from the memory device 6230 to the host 6210. When the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using one of various coded modulations such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCI-e) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired and/or wireless electronic appliances, for example, a mobile electronic appliance.

Figure 18:
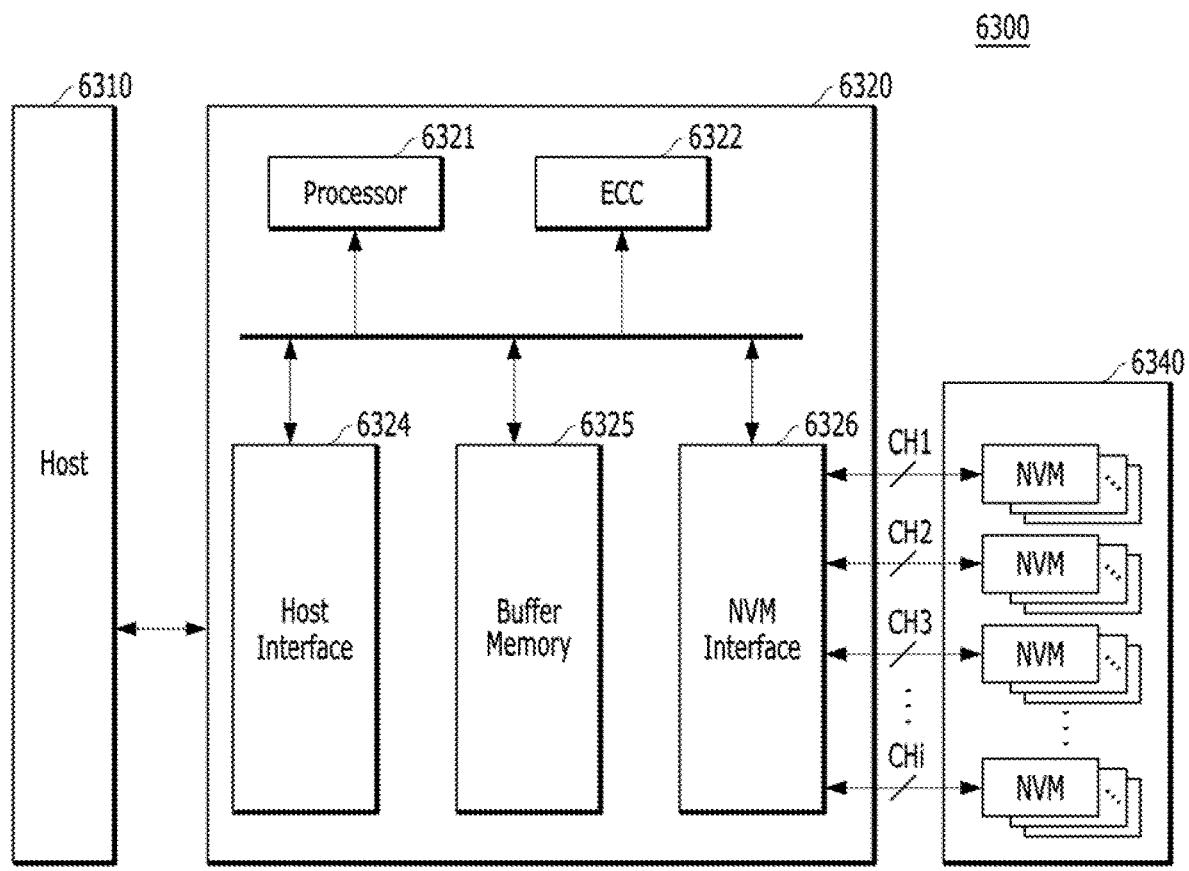

FIG. 18 is a diagram illustrating an example of a data processing system including a memory system according to an embodiment of the invention. For example, in FIG. 18, a solid state drive (SSD) 6300 employing a memory system is shown.

Referring to FIG. 18, the SSD 6300 may include a memory device 6340 which may include a plurality of nonvolatile memories NVM, and a controller 6320. The controller 6320 may correspond to the controller 130 in the memory system 110 described above with reference to FIG. 1. The memory device 6340 may correspond to the memory device 150 in the memory system 110 described above with reference to FIG. 1.

The controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 10, that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and performs an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system for example, at least one SSD 6300 in response to the RAID level information of the write command received from the host 6310, among a plurality of RAID levels for example, the plurality of SSDs 6300 and may output data corresponding to the write command, to the selected SSD 6300. When performing a read operation by receiving a read command from the host 6310, the RAID controller may select at least one memory system for example, at least one SSD 6300 in response to the RAID level information of the write command received from the host 6310, among the plurality of RAID levels for example, the plurality of SSDs 6300, and may provide data outputted from the selected SSD 6300, to the host 6310.

Figure 19:
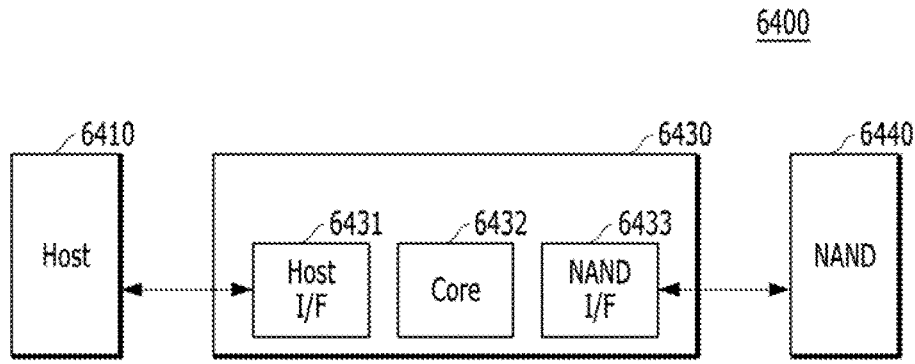

FIG. 19 is a diagram illustrating another example of a data processing system including the memory system according to an embodiment of the present invention. For example, in FIG. 19, an embedded multimedia card (eMMC) 6400 is shown.

Referring to FIG. 19, the eMMC 6400 may include a memory device 6440 which is implemented with at least one NAND flash memory, and a controller 6430. The controller 6430 may correspond to the controller 130 in the memory system 110 described above with reference to FIG. 1. The memory device 6440 may correspond to the memory device 150 in the memory system 110 described above with reference to FIG. 1.

The controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 20:
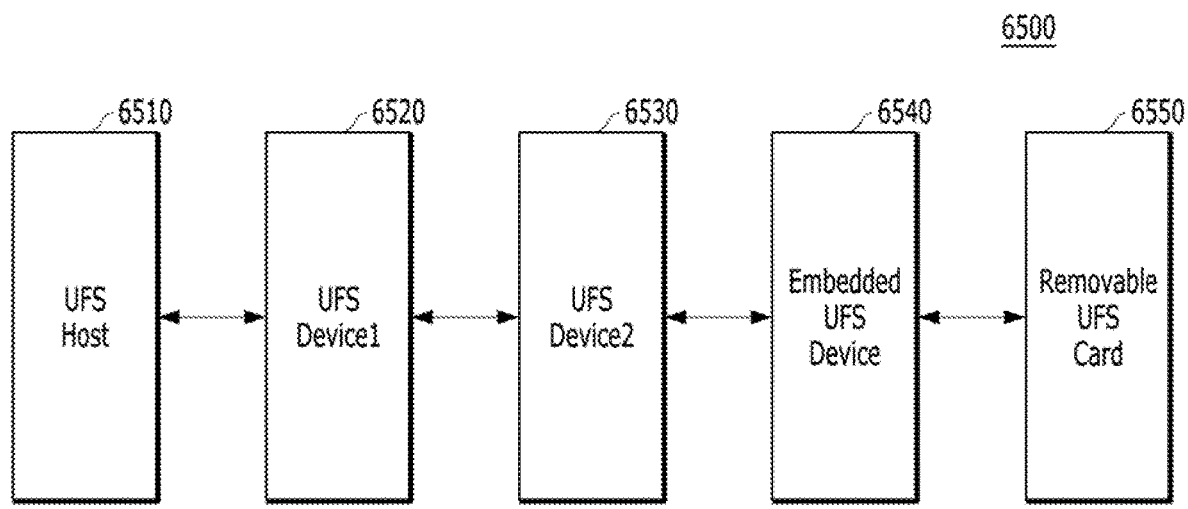

FIG. 20 is a diagram illustrating another example of a data processing system including a memory system according to an embodiment of the present invention. For example, FIG. 20 illustrates a universal flash storage (UFS) 6500 to which the memory system according to the embodiment is applied.

Referring to FIG. 20, the UFS system 6500 may include a UFS host 6510, a plurality of UFS devices 6520 and 6530, an embedded UFS device 6540, and a removable UFS card 6550. The UFS host 6510 may be an application processor of wired and/or wireless electronic appliances, for example, a mobile electronic appliance.

The UFS host 6510, the UFS devices 6520 and 6530, the embedded UFS device 6540 and the removable UFS card 6550 may respectively communicate with external devices such as wired and/or wireless electronic appliances for example, a mobile electronic appliance, for example, through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 16. The embedded UFS device 6540 and the removable UFS card 6550 may also communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 21:
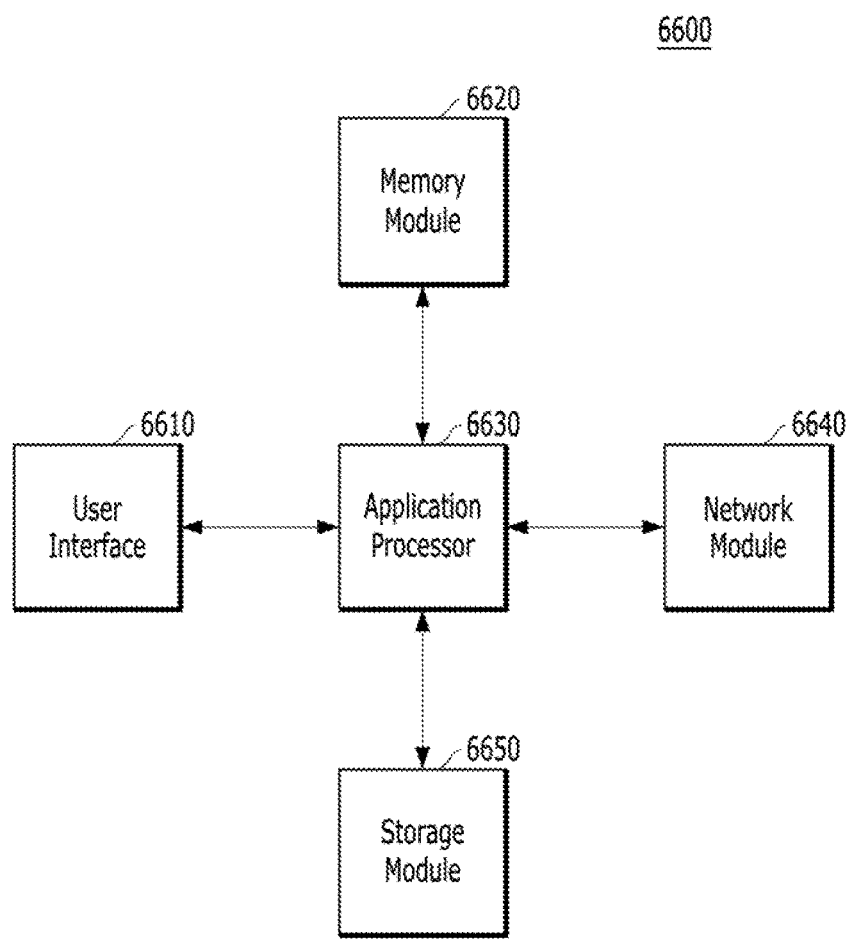

FIG. 21 is a diagram illustrating an example of a data processing system including the memory system according to an embodiment of the present invention. For example, in FIG. 21, a user system 6600 employing the memory system is shown.

Referring to FIG. 21, the user system 6600 may include a user interface 6610, a memory module 6620, an application processor 6630, a network module 6640, and a storage module 6650.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired and/or wireless electronic appliances, for example, a mobile electronic appliance. Therefore, the memory system and the data processing system according to the embodiment may be applied to wired and/or wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 18 to 20.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

When the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired and/or wireless communication with an external device, as described above. The user interface 6610 as the display/touch module of the mobile electronic appliance displays data processed by the application processor 6630 or supports input of data from a touch panel.

As described above, the memory system and the operating method thereof in accordance with the embodiment may solve the problems of a buffer structure accessing data by executing consecutive addressing and a buffer structure accessing slot data by a predetermined unit, and access data by using the advantages of the respective buffer structures. In the memory system and the operating method thereof in accordance with the embodiment, when writing data in a buffer memory or reading data written in the buffer memory, consecutive addressing may be designated by a start address and a data size while obviating the need for defragmentation, and management by a slot unit is made possible while obviating the need for setting descriptors or a linked list, thereby avoiding an overhead that is likely to cause performance deterioration.

Although various embodiments have been described for illustrative purposes, it will be apparent to those skilled in the art that various changes and modifications may be made without departing from the spirit and scope of the invention as defined in the following claims.

What is claimed is:

1. A memory control device comprising:
a buffer memory in which data is accessed by a unit of a slot; and
a buffer interface suitable for controlling an access to the buffer memory and checking a write command and a size of data,
wherein the buffer interface includes:
a mapping table suitable for storing the mapping between multiple virtual slot identification information (VBIDs) and multiple physical slot identification information (PBIDs);
a buffer allocation unit suitable for determining a start VBID of the mapping table and the number of slots (NID) based on the size of data and a size of slot in the buffer memory, and allocating PBIDs of a free status to a buffer slot sequence in the mapping table, the buffer slot sequence including slots associating VBIDs, determined sequentially corresponding to the start VBID to a last VBID which is a VBID followed by the NID after the start VBID, with the PBIDs randomly selected; and
a buffer access unit suitable for using the start VBID and the NID for accessing data at positions of the PBIDs of the buffer memory based on the mapping table.

2. The memory control device according to claim 1, wherein the mapping table comprises: a first region for storing sequential VBIDs; and
a second region for storing the PBIDs allocated by the buffer allocation unit and the VBIDs included in the buffer slot sequence being mapped to each other.

3. The memory control device according to claim 2, wherein the number of virtual slots stored in the second region is allocated to be greater than the number of physical slots stored in the second region, and the first region has a ring buffer structure.

4. The memory control device according to claim 3, wherein the buffer access unit stores the data at the positions of the PBIDs of the buffer memory mapped to the buffer slot sequence in a write mode.

5. The memory control device according to claim 4, wherein the buffer interface further comprises: a slot status table suitable for storing information regarding status of the PBIDs, and
wherein, in the write mode, the buffer allocation unit selects PBIDs of the free status in the slot status table, and transitions the selected PBIDs to a use status.

6. The memory control device according to claim 3, wherein the buffer access unit reads data written at the positions of the PBIDs of the buffer memory mapped to the buffer slot sequence in a read mode.

7. The memory control device according to claim 6, wherein the buffer allocation unit transitions the PBIDs read from the buffer memory, to the free status in the slot status table.

8. A memory system comprising:
a memory device; and
a controller coupled to a host, electrically coupled with the memory system, and the memory device,
wherein the controller includes:
a host interface suitable for interfacing an access command and data with the host;
a memory interface suitable for interfacing an access command and data with the memory device;
a buffer memory in which data is accessed by a unit of a slot; and
a buffer interface suitable for checking a write command and a size of data and generating a mapping table and buffering data in the buffer memory based on the mapping table, wherein the mapping table stores the mapping between multiple virtual slots and multiple physical slots of the buffer memory accessed by the unit of slot based on the access command from the host interface and a data size,
wherein the buffer interface comprises:
the mapping table suitable for storing the mapping between multiple virtual slot identification information (VBIDs) and multiple physical slot identification information (PBIDs);
a buffer allocation unit suitable for determining a start VBID of the mapping table and the number of slots (NID) based on the size of data and a size of slot in the buffer memory, and allocating PBIDs of a free status to a buffer slot sequence in the mapping table, the buffer slot sequence including slots associating VBIDs, determined sequentially corresponding to the start VBID to a last VBID which is a VBID followed by the NID after the start VBID, with the PBIDs randomly selected; and
a buffer access unit suitable for using the start VBID and the NID for accessing data at positions of the PBIDs of the buffer memory based on the mapping table.

9. The memory system according to claim 8, wherein the mapping table comprises:
a first region for storing sequential VBIDs; and
a second region for storing the PBIDs allocated by the buffer allocation unit and the VBIDs included in the buffer slot sequence being mapped to each other.

10. The memory system according to claim 9, wherein the number of VBIDs stored in the second region is allocated to be greater than the number of PBIDs stored in the second region, and the first region has a ring buffer structure.

11. The memory system according to claim 10,
wherein the buffer access unit stores data from the host interface, at the positions of the PBIDs of the buffer memory mapped to the buffer slot sequence in a write mode, and
wherein, upon completion of transmission of the data from the host interface, the buffer access unit reads sequentially the data written at the positions of the PBIDs of the buffer memory, and outputs the read-out data to the memory interface.

12. The memory system according to claim 11,
wherein the buffer access unit writes data from the memory interface, at the positions of the PBIDs of the buffer memory mapped to the buffer slot sequence based on the mapping table, in a read mode, and
wherein, upon completion of reading of the memory device in the memory interface, the buffer access unit reads the data written at the positions of the PBIDs of the buffer memory mapped to the buffer slot sequence based on the mapping table, and outputs the read-out data to the host interface.

13. The memory system according to claim 12, wherein the buffer interface further comprises: a slot status table suitable for storing information regarding status of the PBIDs, and
wherein the buffer allocation unit selects PBIDs of a free status in the slot status table, maps the selected PBIDs to the mapping table and transitions the selected PBIDs to a use status in the write mode, and transitions the PBIDs read from the buffer memory, to the free status in the slot status table in the read mode.

14. A method for accessing a buffer memory in which data is accessed by a unit of a slot, comprising:
checking a write command and a size of data;
determining a start virtual slot identification information (VBID) of a mapping table and the number of slots (NID) based on the size of data and a size of slot in the buffer memory, wherein the mapping table stores the mapping between multiple virtual slot identification information (VBIDs) and multiple physical slot identification information (PBIDs);
allocating PBIDs of a free status to a buffer slot sequence in the mapping table, the buffer slot sequence including slots associating VBIDs, determined sequentially corresponding to the start VBID to a last VBID which is a VBID followed by the NID after the start VBID, with the PBIDs randomly selected; and
using the start VBID and the NID for accessing data at positions of the PBIDs of the buffer memory based on the mapping table.

15. The method according to claim 14, further comprising:
transitioning the PBIDs mapped in the mapping table, to a use status, after generating the mapping table.

16. The method according to claim 15, further comprising:
reading and outputting data written at the positions of the PBIDs of the buffer memory mapped in the mapping table, upon a read request.

17. The method according to claim 16, further comprising:
transitioning the PBIDs mapped in the mapping table, to the free status, after outputting the data.

18. A method for operating a memory system including a buffer memory in which data is accessed by a unit of a slot, comprising:
checking a write command and a data size;
generating a mapping table and buffering data in the buffer memory based on the mapping table, wherein the mapping table stores the mapping between multiple virtual slots and multiple physical slots of the buffer memory accessed by the unit of slot based on the access command and the data size; and
transmitting the data buffered in the buffer memory to one of a memory device or a host,
wherein the buffer interface process comprises:
determining a start virtual slot identification information (VBID) of the mapping table and the number of slots (NID) based on the data size and a size of slot;
allocating PBIDs of a free status to a buffer slot sequence in the mapping table, the buffer slot sequence including slots associating VBIDs, determined sequentially corresponding to the start VBID to a last VBID which is a VBID followed by the NID after the start VBID, with the PBIDs randomly selected.

19. The method according to claim 18, wherein the access command is a write command, and
wherein the buffer interface process comprises:
writing the data from the host, at positions of the PBIDs of the buffer memory, based on the mapping table; and
using the start VBID and the NID for reading data written at the positions of the PBIDs of the buffer memory based on the mapping table and transmitting the read-out data to the memory device, upon a read request.

20. The method according to claim 19, wherein the access command is a read command, and
wherein the buffer interface process comprises:
writing data read from the memory device, at positions of the PBIDs of the buffer memory, based on the mapping table; and
using the start VBID and the NID for reading data written at the positions of the PBIDs of the buffer memory based on the mapping table and transmitting the read-out data to the host, upon a read request.

* * * * *